US011310782B2

(12) United States Patent
Li et al.

(10) Patent No.: US 11,310,782 B2
(45) Date of Patent: Apr. 19, 2022

(54) SYSTEM AND METHOD FOR CENTRALIZED SIDELINK SCHEDULING

(71) Applicant: QUALCOMM Incorporated, San Diego, CA (US)

(72) Inventors: Junyi Li, Chester, NJ (US); Tao Luo, San Diego, CA (US); Jung Ho Ryu, Fort Lee, NJ (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 60 days.

(21) Appl. No.: 15/930,392

(22) Filed: May 12, 2020

(65) Prior Publication Data

US 2020/0396720 A1  Dec. 17, 2020

Related U.S. Application Data

(60) Provisional application No. 62/861,969, filed on Jun. 14, 2019.

(51) Int. Cl.
*H04W 72/04* (2009.01)
*H04W 76/14* (2018.01)
*H04W 92/18* (2009.01)

(52) U.S. Cl.
CPC ....... *H04W 72/042* (2013.01); *H04W 72/044* (2013.01); *H04W 76/14* (2018.02); *H04W 92/18* (2013.01)

(58) Field of Classification Search
CPC ... H04W 76/14; H04W 72/02; H04W 72/042; H04W 72/044; H04W 72/0406; H04W 92/18
See application file for complete search history.

(56) References Cited

U.S. PATENT DOCUMENTS

2016/0142991 A1* 5/2016 Classon ............... H04W 76/14
370/350
2016/0345312 A1  11/2016 Kim et al.
(Continued)

FOREIGN PATENT DOCUMENTS

WO  2019036578 A1  2/2019

OTHER PUBLICATIONS

International Search Report and Written Opinion—PCT/US2020/032750—ISA/EPO—dated Jul. 24, 2020.

*Primary Examiner* — Pankaj Kumar
*Assistant Examiner* — Kenneth P Hunt
(74) *Attorney, Agent, or Firm* — Arent Fox, LLP

(57) ABSTRACT

A first apparatus may receive, on a first control channel, information indicating a first set of resources allocated on a second control channel; send, to a second UE based on the first set of resources allocated on the second control channel, information associated with communication on a data channel; and send data to the second UE on the data channel based on the information associated with the communication on the data channel. A second apparatus may receive, on a first control channel, information indicating a first set of resources allocated on a second control channel; receive, from a second UE based on the first set of resources allocated on the second control channel, information associated with communication on a data channel; and receive data from the second UE on the data channel based on the information associated with the communication on the data channel.

20 Claims, 14 Drawing Sheets

(56) References Cited

U.S. PATENT DOCUMENTS

| | | | |
|---|---|---|---|
| 2017/0245313 A1* | 8/2017 | Kim | H04L 1/1854 |
| 2018/0206132 A1* | 7/2018 | Guo | H04W 72/0473 |
| 2019/0364554 A1* | 11/2019 | Kuang | H04W 72/0453 |
| 2020/0022089 A1* | 1/2020 | Guo | H04L 5/0048 |
| 2020/0359366 A1* | 11/2020 | Kim | H04L 1/1812 |

* cited by examiner

SYSTEM AND METHOD FOR CENTRALIZED SIDELINK SCHEDULING

CROSS REFERENCE TO RELATED APPLICATION(S)

This application claims the benefit of U.S. Provisional Application Ser. No. 62/861,969, entitled "SYSTEM AND METHOD FOR CENTRALIZED SIDELINK SCHEDULING" and filed on Jun. 14, 2019, which is expressly incorporated by reference herein in its entirety.

BACKGROUND

Technical Field

The present disclosure relates generally to communications systems, and more particularly, to centralized scheduling of communication on at least one sidelink channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various radio access technologies (RATs), two or more user equipment (UE) may directly communicate with one another. Direct communication between the two or more UEs may be known as sidelink communication, and may occur on one or more sidelink channels.

In order to communicate on the one or more sidelink channels, however, various parameters may first be established, e.g., in order for a receiving UE to successfully receive and decode data and/or control information on the one or more sidelink channels. Examples of these various parameters may include a modulation and coding scheme (MCS) for communication on a sidelink data channel, information associated with a hybrid automatic repeat request (HARQ) process for the sidelink data channel, a set of resources allocated on the sidelink data channel, and/or an index associated with a beam for the communication on the sidelink data channel.

In some existing approaches, direct communication between two or more UEs may be controlled by a base station. Specifically, the base station may configure the various parameters for communication on the one or more sidelink channels. However, the various parameters for communication on the one or more sidelink channels may be irrelevant to the base station, as the sidelink communication is directly between the two or more UEs and does not pass through the base station. Therefore, a need exists to improve the performance and/or efficiency of sidelink communication.

The present disclosure may present techniques and approaches to address the performance and/or efficiency of sidelink communication. For example, the present disclosure may describe a centralized approach to sidelink scheduling. According to this centralized approach, a subset of the set of information associated with sidelink communication between at least two UEs may be reassigned from the base station to one UE participating in the sidelink communication with at least one other UE. In so doing, over-the-air signaling from the base station may be reduced, which may reduce the computational load on the base station. Further, latency in sidelink communication may be reduced because a subset of the information associated with the sidelink communication may be directly communicated between UEs, instead of following a path through the base station.

In a first aspect of the disclosure, a first method, a first computer-readable medium, and a first apparatus are provided. The first apparatus may receive, on a first control channel, information indicating a first set of resources allocated on a second control channel. The first apparatus may send, to a second UE based on the first set of resources allocated on the second control channel, information associated with communication on a data channel. The first apparatus may send data to the second UE on the data channel based on the information associated with the communication on the data channel.

In a second aspect of the disclosure, a second method, a second computer-readable medium, and a second apparatus are provided. The second apparatus may receive, on a first control channel, information indicating a first set of resources allocated on a second control channel. The second apparatus may receive, from a second UE based on the first set of resources allocated on the second control channel, information associated with communication on a data channel. The second apparatus may receive data from the second UE on the data channel based on the information associated with the communication on the data channel.

In a third aspect of the disclosure, a third method, a third computer-readable medium, and a third apparatus are provided. The third apparatus may allocate a set of resources for a first UE and a second UE on a first control channel. The third apparatus may send, to the first UE and the second UE on a second control channel, information indicating a first identifier associated with the first UE, a second identifier associated with the second UE, and the set of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
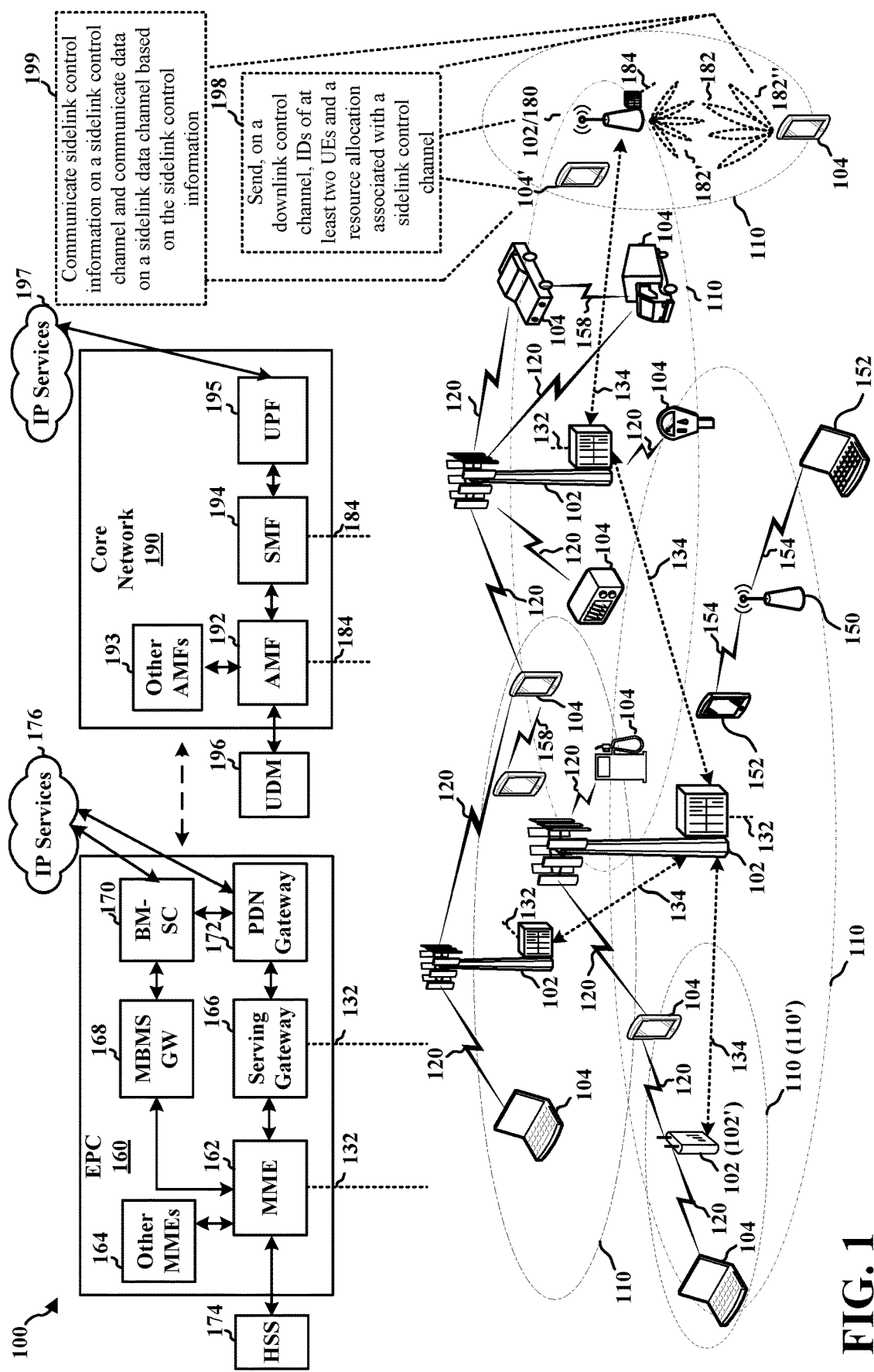
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-A, Code Division Multiple Access (CDMA), Global System for Mobile communications (GSM), and/or other wireless/radio access technologies.

Referring again to FIG. 1, in certain aspects, at least two UEs 104, 104' may directly communicate on one or more sidelink channels. For example, when the two UEs 104, 104' communicate data on a sidelink data channel, the transmitting UE 104 may send the data directly to the receiving UE 104' on the sidelink data channel such that the data does not traverse a base station 102/180, EPC 160, and/or other core network 190. According to various aspects, the direct communication may include D2D communication, vehicle-to-everything (V2X) communication, infrastructure-to-everything (I2X) communication, and the like.

While data directly communicated between the UEs 104, 104' may not traverse the base station 102/180, the sidelink communication between the UEs 104, 104' may be scheduled in a centralized manner. Accordingly, the base station 102/180 may facilitate the sidelink communication, for example, in order to reduce scheduling conflicts between the UEs 104, 104', reduce interference experienced in a coverage area 110/110' of the base station 102/180 when the two UEs 104, 104' directly communicate, and so forth.

Thus, the base station 102/180 may allocate a set of resources associated with the sidelink communication between the transmitting UE 104 and the receiving UE 104'. For example, the base station 102/180 may allocate a set of resources on a sidelink control channel for the two UEs 104, 104'.

The base station 102/180 may send information indicating the allocated set of resources on the sidelink control channel to each of the UEs 104, 104'. The base station 102/180 may send this information indicating the allocated set of resources on a downlink control channel. However, the base station 102/180 may send the information indicating the allocated set of resources on the same downlink control channel (e.g., the same set of resources at a same aggregation level) for both UEs 104/104'.

In order to send information to both UEs 104, 104' on the same downlink control channel, the base station 102/180 may identify both UEs 104, 104' when assigning the downlink control channel to both UEs 104, 104'. Therefore, the base station 102/180 may send, on a downlink control channel, information indicating a first identifier (ID) of the transmitting UE 104, information indicating a second ID of the receiving UE 104', and information indicating the allocated set of resources on the sidelink control channel (198).

Each of the transmitting UE 104 and the receiving UE 104' may receive the information on the downlink control channel. Each of the transmitting UE 104 and the receiving UE 104' may respectively detect the ID of the transmitting UE 104 and the ID of the receiving UE 104' in the information received from the base station 102/180. In so doing, the transmitting and receiving UEs 104, 104' may determine that the downlink control channel includes information applicable to the transmitting and receiving UEs 104, 104' based on the detected respective IDs the transmitting and receiving UEs 104, 104'.

To engage in direct communication, the transmitting UE 104 may schedule data on a sidelink data channel. In scheduling data on the sidelink data channel, the transmitting UE 104 may determine a set of parameters associated with the sidelink communication. The set of parameters may include information that enables the receiving UE 104' to successfully detect and decode the data sent on the sidelink data channel. Examples of one or more of the set of parameters include a modulation and coding scheme (MCS) for communication on a sidelink data channel, information associated with a hybrid automatic repeat request (HARQ) process for the sidelink data channel, a set of resources allocated on the sidelink data channel, an index associated with a beam for the communication on the sidelink data channel, and/or other scheduling information.

Based on the received information indicating the set of resources allocated for the sidelink control channel, the transmitting UE 104 may send the set of parameters to the receiving UE 104. That is, the transmitting UE 104 may send the set of parameters to the receiving UE 104' on one or more time/frequency resources indicated by the base station 102/180 in the information on the downlink control channel.

Because the receiving UE 104' received the same information on the downlink control channel from the base station 102/180, the receiving UE 104' may successfully detect and decode the set of parameters sent by the transmitting UE 104 on the sidelink control channel. The receiving UE 104' may use the received set of parameters to detect and decode data on the sidelink data channel.

The transmitting UE 104 may subsequently send data to the receiving UE 104' on the sidelink data channel based on the set of parameters. The receiving UE 104' may successfully detect and decode the data on the sidelink data channel based on the received set of parameters. Accordingly, the transmitting and receiving UEs 104/104' may communicate sidelink control information on the sidelink control channel and communicate sidelink data on the sidelink data channel based on the sidelink control information (199).

Figure 2:
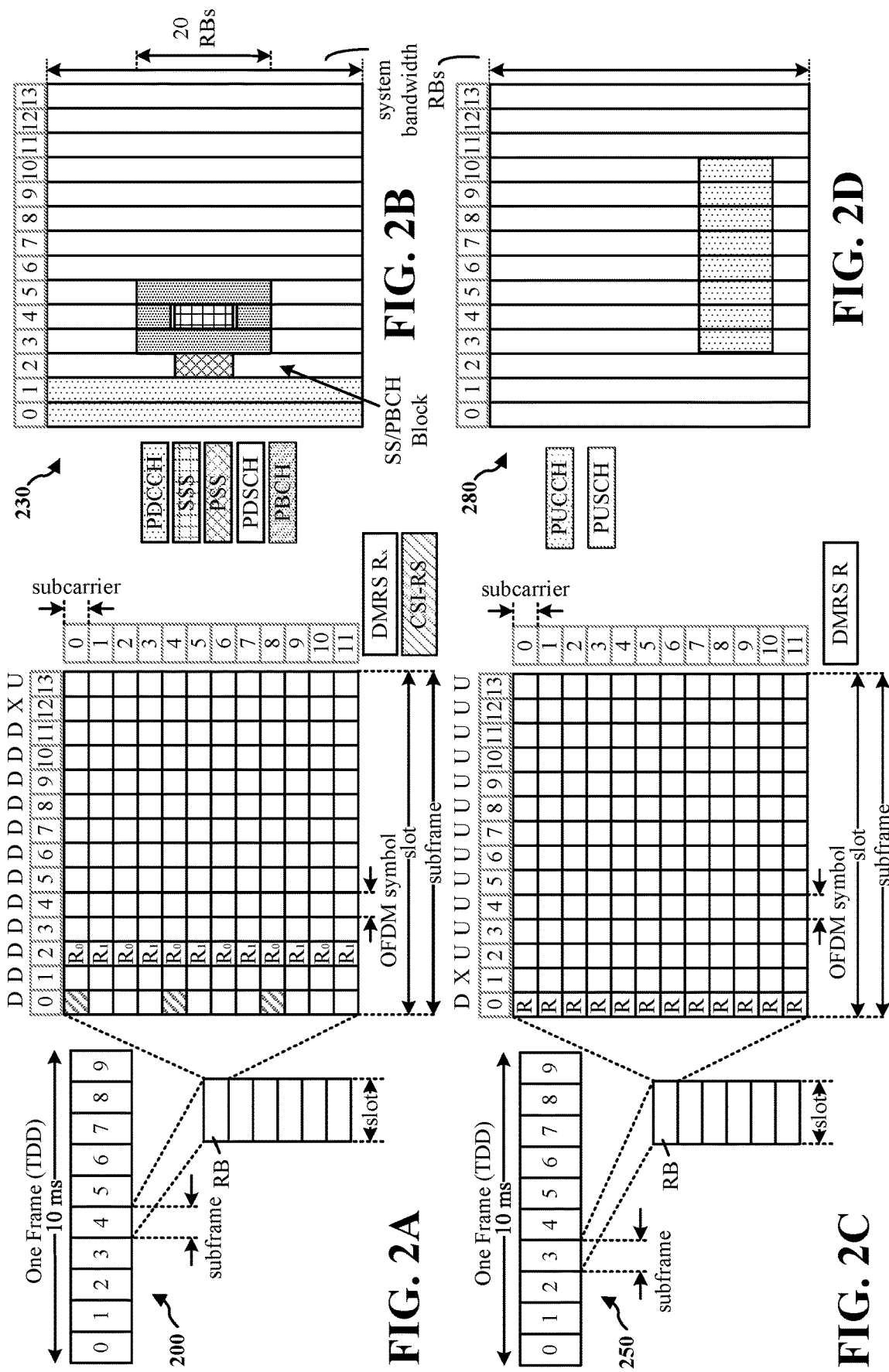
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
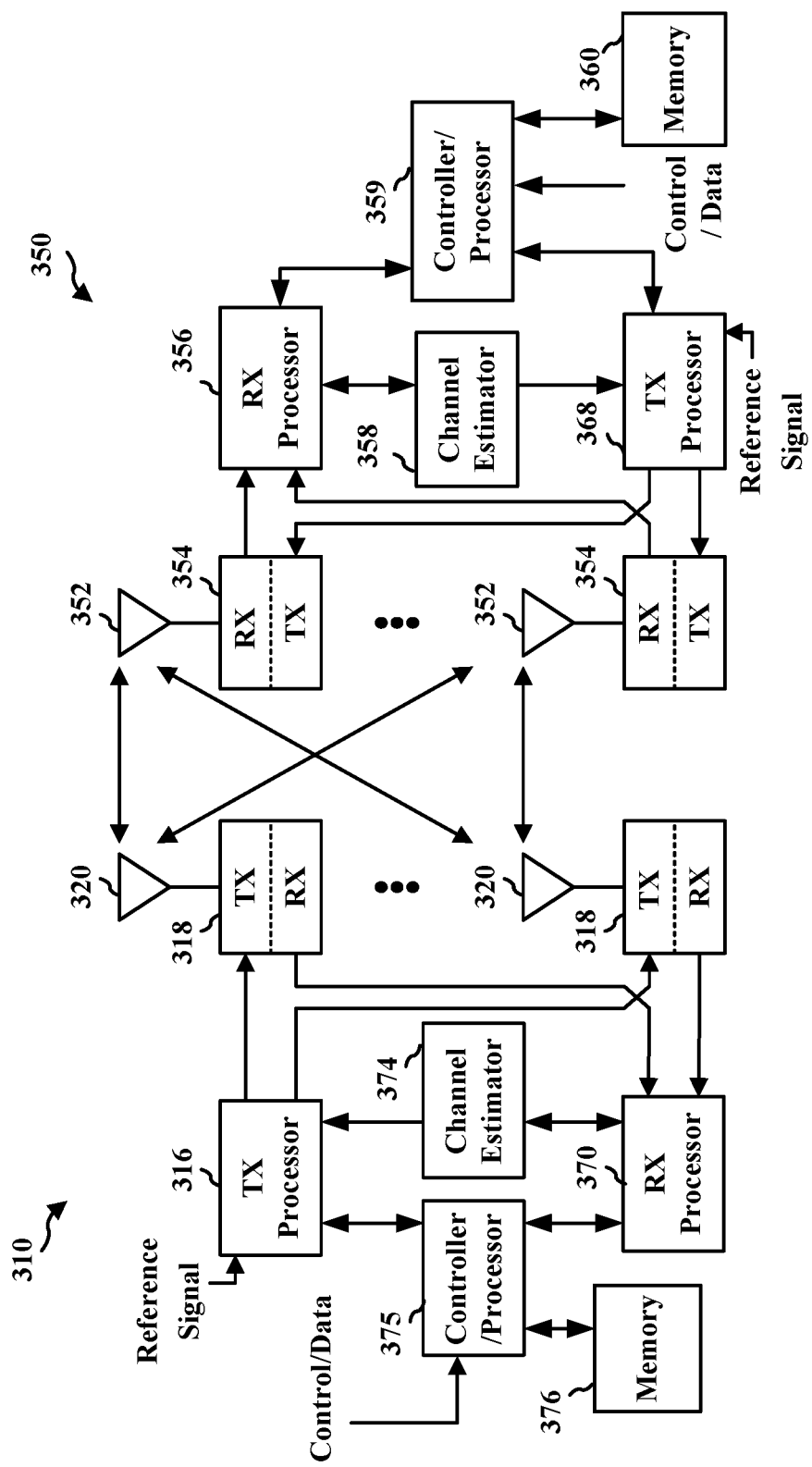
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

According to some aspects, at least one of the TX processor 316, the RX processor 370, and the controller/processor 375 may be configured to perform aspects in connection with (198) of FIG. 1.

According to some other aspects, at least one of the TX processor 368, the RX processor 356, and the controller/processor 359 may be configured to perform aspects in connection with (198) and/or (199) of FIG. 1.

Referring to FIGS. 4-7, as described, supra, two or more UEs may directly communicate with one another on one or more sidelink channels. In order to communicate on the one or more sidelink channels various parameters may first be established, e.g., in order for a receiving UE to successfully receive and decode data and/or control information on the one or more sidelink channels. Examples of these various parameters may include an MCS for communication on a sidelink data channel, information associated with a HARQ process for the sidelink data channel, a set of resources allocated on the sidelink data channel, and/or an index associated with a beam for the communication on the sidelink data channel.

In some existing approaches, direct communication between two or more UEs may be controlled by a base station. Specifically, the base station may configure the various parameters for communication on the one or more sidelink channels. However, the various parameters for communication on the one or more sidelink channels may be irrelevant to the base station, as the sidelink communication is directly between the two or more UEs and does not pass through the base station. Therefore, a need exists to improve the performance and/or efficiency of sidelink communication.

FIGS. 4-7 present techniques and approaches to address the performance and/or efficiency of sidelink communication. For example, FIGS. 4-7 describe a centralized approach to sidelink scheduling. According to this centralized approach, a subset of the set of information associated with sidelink communication between at least two UEs may be reassigned from the base station to one UE participating in the sidelink communication with at least one other UE. In so doing, over-the-air signaling from the base station may be reduced, which may reduce the computational load on the base station. Further, latency in sidelink communication may be reduced because a subset of the information associated with the sidelink communication may be directly communicated between UEs, instead of following a path through the base station.

Figure 4:
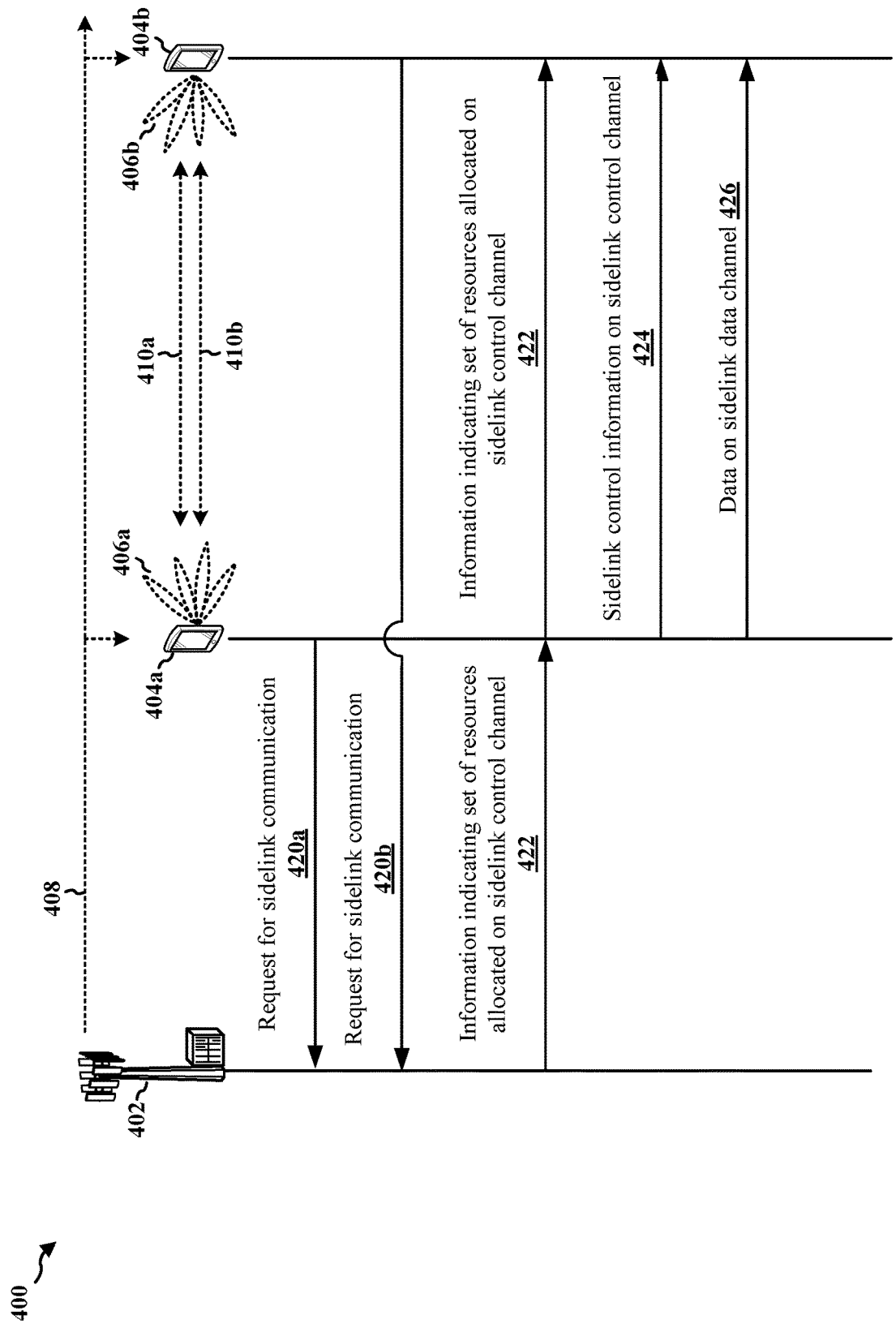
FIG. 4 is a diagram illustrating a call flow between at least two UEs and a base station for wireless sidelink communication between the at least two UEs.

FIG. 4 is a diagram illustrating a call flow 400 for centralized scheduling of sidelink communication. According to the call flow 400, a base station 402 may facilitate the centralized scheduling of the sidelink communication between the at least two UEs 404a, 404b. In the context of FIG. 1, the base station 402 may be implemented as the base station 102/180, the first UE 404a may be implemented as the transmitting UE 104, and the second UE 404b may be implemented as the receiving UE 104'. In the context of FIG. 3, the base station 402 may be implemented as the base station 310, and each of the UEs 404a, 404b may be implemented as the UE 350.

Each of the UEs 404a, 404b may communicate with the base station 402. For example, each of the UEs 404a, 404b may be synchronized with the base station 402 following a respective random access channel (RACH) procedure respectively performed by each of the UEs 404a, 404b. When one of the UEs 404a, 404b communicates with the base station, the communication may occur on an access link. Examples of such an access link may include the Uu interfaces defined for LTE and/or 5G NR.

Communication on the access link between the base station 402 and at least one of the UEs 404a, 404b may be carried on at least one physical channel, such as a PUCCH for uplink or a PDCCH for downlink. For example, control information on the access link from the base station 402 to each of the UEs 404a, 404b may be carried on a downlink control channel 408, which may be implemented as the PDCCH.

In addition to communicating with the base station 402, each of the UEs 404a, 404b may directly communicate with another one of the UEs 404a, 404b. The direct communication between the UEs 404a, 404b may include D2D communication, V2X communication, I2X communication, or another similar communication protocol in which data directly communicated between the UEs 404a, 404b traverses neither the base station 402 nor the EPC (or other core network).

For sidelink communication, the UEs 404a, 404b may directly communicate with one another over a sidelink. Examples of such a sidelink may include the PC5 interfaces defined for V2X in LTE and/or 5G NR. Like the access link, communication on the sidelink may be carried on at least one physical channel.

On the sidelink, control information may be carried on a sidelink control channel 410a, such as the PSCCH. Data on the sidelink, however, may be carried on a sidelink data channel 410b, which may also be referred to as a sidelink shared channel. An example of the sidelink data channel 410b may include the PSSCH.

To directly receive data on the sidelink data channel 410b, the data may be scheduled on a set of resources on the sidelink data channel 410b. Scheduling information for the data on the sidelink data channel 410b may be carried on the sidelink control channel 410a.

Additional information for successfully receiving and decoding the data on the sidelink data channel 410b may also be carried on the sidelink control channel 410a. For example, the sidelink control channel 410a may carry at least one of an MCS for communication on the sidelink data channel 410b, information associated with a HARQ process for the sidelink data channel 410b, a set of resources allocated on the sidelink data channel 410b, and/or a transmission configuration indicator (TCI) state associated with the sidelink data channel 410b (e.g., the TCI state may indicate an index associated with a beam of the transmitting UE, such as an active beam of the beams 406a of the first UE 404a).

According to various aspects, the sidelink communication may occur in a mmW spectrum and/or near-mmW spectrum. For example, one or more 3GPP standards for 5G NR may define communication in mmW and/or near-mmW frequencies. Thus, each of the UEs 404a, 404b may communicate on the sidelink using beamforming in order to train the respective directional beams 406a, 406b of the UEs 404a, 404b. In connection therewith, the UEs 404a, 404b may perform a beam training process in order to identify the best TX/RX beam pairs between the UEs 404a, 404b.

The beam training process between the UEs 404a, 404b may occur during a discovery phase (e.g., a phase prior to communicating control information and data on the sidelink control channel 410a and the sidelink data channel 410b, respectively). The discovery phase may occur on the PSDCH, instead of the sidelink control and data channels 410a, 410b.

During the beam training process, one of the UEs 404a, 404b may sweep through a plurality of TX directions and send at least one reference signal in each of the plurality of TX directions. Correspondingly, the other of the UEs 404a, 404b may sweep through a plurality of RX directions and detect each reference signal sent in each of the plurality of TX directions.

The other of the UEs 404a, 404b may identify a "best" RX beam in each of the RX directions, and the best RX beam in each of the RX directions may correspond to the RX beam on which a reference signal is received having a highest measured quality (e.g., highest signal-to-noise ratio (SNR), highest reference signal receive power (RSRP), etc.).

In each of the RX directions, the other of the UEs 404a, 404b may determine a beam pair for receiving in an RX direction by correlating the best RX beam in a respective direction with the TX beam on which the reference signal is transmitted. The other of the UEs 404a, 404b may identify the TX beam to correlate with the best RX beam to form the beam pair based on the respective reference signal received in that RX direction and/or based on at least one resource on which the respective reference signal is received, at least one of which may indicate an index of the TX beam on which the respective reference signal is sent by the one of the UEs 404a, 404b.

After the one of the UEs 404a, 404b first acts as the transmitter and the other of the UEs 404a, 404b acts as the receiver when sweeping through the plurality of TX/RX directions, the UEs 404a, 404b may switch functions. Thus, the other of the UEs 404a, 404b may sweep through each of the plurality of TX directions and, in each of the plurality of TX directions, the other of the UEs 404a, 404b may send a respective reference signal on a respective TX beam.

Correspondingly, the one of the UEs 404a, 404b may sweep through a plurality of RX directions and detect each reference signal sent in each of the plurality of TX directions by the other of the UEs 404a, 404b. The one of the UEs 404a, 404b may therefore identify a beam pair for each TX/RX direction, as described supra.

The UEs 404a, 404b may determine that the UEs 404a, 404b wish to engage in direct communication based on the discovery phase, such as by determining a service provided by one of the UEs 404a, 404b that the other of the UEs 404a, 404b wishes to receive. The direct communication between the UEs 404a, 404b may be scheduled according to a centralized approach, which may be enabled by the base station 402. Thus, the base station 402 may allocate a set of resources for the UEs 404a, 404b on the sidelink control channel 410a.

The set of resources allocated by the base station 402 may include a set of PRBs for resource sharing on the sidelink. According to one aspect, the base station 402 may reserve a plurality of resources for sidelink communication, e.g., in a cell provided by the base station 402.

When the base station 402 receives at least one of the requests 420a, 420b identifying the UEs 404a, 404b that wish to communicate on the sidelink, the base station 402 may allocate the set of resources for the UEs 404a, 404b on the sidelink control channel 410a from the plurality of resources reserved for sidelink communication (that is, the set of resources for the UEs 404a, 404b on the sidelink control channel 410a may be a subset of the plurality of resources reserved for sidelink communication in the cell provided by the base station 402).

In some aspects, when the UEs 404a, 404b wish to engage in sidelink communication, at least one of the UEs 404a, 404b may request that the base station 402 configure at least a portion of the sidelink communication. For example, the first UE 404a may wish to directly communicate on the sidelink with the second UE 404b and, therefore, the first UE 404a may send a first request 420a for sidelink communication with the second UE 404b to the base station 402 and the second UE 404b may similarly send a second request 420b for sidelink communication with the first UE 404a to the base station 402. Both the first and second requests 420a, 420b may include a first ID of the first UE 404a and/or may include a second ID of the second UE 404b.

The base station 402 may receive the first and second requests 420a, 420b. The base station 402 may allocate the set of resources for the UEs 404a, 404b on the sidelink control channel based on at least one of the requests 420a, 420b. For example, the base station 402 may identify the UEs 404a, 404b that wish to communicate on the sidelink based on the IDs of the UEs 404a, 404b included in at least one of the requests 420a, 420b.

In order to indicate the set of resources allocated for the UEs 404a, 404b on the sidelink control channel 410a, the base station 402 may send information indicating the allocated set of resources on the access link to each of the UEs 404a, 404b. For example, the base station 402 may send information 422 indicating the set of resources allocated on the sidelink control channel 410a as control information on the downlink control channel 408.

According to some existing approaches, control information for a specific UE may be sent in a UE-specific search space of the PDCCH. For example, the first UE 404a is to receive DCI for the first UE 404a, the base station 402 may send such DCI in a search space of the PDCCH specific to the first UE 404a, and that search space may not identify the second UE 404b and/or may not be decodable by the second UE 404b.

However, the information 422 indicating the set of resources allocated on the sidelink control channel 410a may be applicable to both the first and second UEs 404a, 404b. Thus, in some aspects, the base station 402 may assign the downlink control channel 408 to both the first UE 404a and the second UE 404b. In so doing, the base station 402 may indicate IDs of both the first UE 404a and the second UE 404b on the same downlink control channel 408. Accordingly, the base station 402 may send, on the downlink control channel 408, information indicating IDs of both the first UE 404a and the second UE 404b and, further, information 422 indicating the set of resources allocated on the sidelink control channel 410a for the first UE 404a and the second UE 404b.

The first UE 404a and the second UE 404b may each receive and decode information carried on the downlink control channel 408. Specifically, the first UE 404a and the second UE 404b may receive and decode information indicating the IDs of the UEs 404a, 404b on the downlink control channel 408, which may indicate that the information 422 on the downlink control channel 408 is intended for the UEs 404a, 404b. When the UEs 404a, 404b find their respective IDs on the downlink control channel 408, the UEs 404a, 404b may receive and decode the information 422 indicating the set of resources allocated on the sidelink control channel 410a for the UEs 404a, 404b.

For the sidelink communication, the first UE 404a may act as a transmitter and the second UE 404b may act as a receiver. Which of the UEs 404a, 404b is to act as the transmitter and which is to act as the receiver may be resolved during the discovery phase.

When the first UE 404a has data to directly send to the second UE 404b, the first UE 404a may determine control information 424 associated with the sidelink data channel 410b. The control information 424 may enable the second UE 404b to successfully detect and decode the data on the sidelink data channel 410b from the first UE 404a. For example, the first UE 404a may determine, for the control information 424, at least one of an MCS for communication on the sidelink data channel 410b, information associated with a HARQ process for the sidelink data channel 410b, a set of resources allocated on the sidelink data channel 410b to carry the data, and/or a TCI state associated with the sidelink data channel 410b (e.g., the TCI state may indicate an index associated with a beam of the first UE 404a, such as an active beam of the beams 406a of the first UE 404a).

In one aspect, the first UE 404a may determine at least a portion of the control information 424 based on the discovery phase with the second UE 404b. For example, the first UE 404a may determine an index corresponding to a TX beam of the beams 406a on which to send the data based on the discovery phase. The first UE 404a may then determine a TCI state based on the index corresponding to TX beam.

The first UE 404a may then send the control information 424 on the sidelink control channel 410a based on the information 422 indicating the set of resources allocated on the sidelink control channel 410a. For example, the first UE 404a may send the control information 424 on the allocated set of resources. According to some aspects, a first time gap may occur between the information 422 on the downlink control channel 408 and the control information 424 on the sidelink control channel 410a. The first time gap may be of a sufficient duration to allow the first UE 404a and the second UE 404b to process the information 422 received on the downlink control channel 408 before the first UE 404a begins sending the control information 424 on the sidelink control channel 410a.

According to various aspects, the base station 402 may refrain from sending some information associated with the sidelink communication between the UEs 404a, 404b, other than the IDs of the UEs 404a, 404b and the allocated set of resources on the sidelink control channel 410a. For example, the base station 402 may refrain from sending the MCS for communication on the sidelink data channel 410b, the information associated with the HARQ process for the sidelink data channel 410b, the set of resources allocated on the sidelink data channel 410b to carry the data, and/or the TCI state associated with the sidelink data channel 410b.

The base station 402 may refrain from sending this information because this information may be irrelevant to the base station 402, as this information may only be applicable to sidelink communication between the UEs 404a, 404b. By refraining from sending this information, over-the-air signaling by the base station 402 and/or computational load on the base station 402 may be reduced. Further, latency between the UEs 404a, 404b during the sidelink communication may be reduced (e.g., because direct communication between the UEs 404a, 404b may be faster than communication through the base station 402).

Because the second UE 404b receives the same information 422 on the downlink control channel 408 as the first UE 404a, the second UE 404b may monitor the same set of resources of the sidelink control channel 410a on which the first UE 404a sends the control information 424. The second UE 404b may therefore successfully detect and decode the control information 424 on the sidelink control channel 410a.

By decoding the control information 424, the second UE 404b may obtain the control information 424, including the at least one of the MCS for communication on the sidelink data channel 410b, the information associated with a HARQ process for the sidelink data channel 410b, the set of resources allocated on the sidelink data channel 410b to carry the data, and/or the TCI state associated with the sidelink data channel 410b.

Subsequently, the first UE 404a may directly send data 426 on the sidelink data channel 410b to the second UE 404b. The first UE 404a may send the data 426 on the sidelink data channel 410b based on the control information 424. For example, the first UE 404a may use the same MCS to send the data 426 on the sidelink data channel 410b as is indicated in the control information 424. In another example, the first UE 404a may send the data 426 on the same set of resources (e.g., in one or more slots and/or subframes) of the sidelink data channel 410b as is indicated in the control information 424.

Based on the control information 424, the second UE 404b may successfully receive and decode the data 426 on the sidelink data channel 410b. For example, the second UE 404b may receive the data 426 using the same MCS as is indicated in the control information 424. In another example, the second UE 404b may monitor for the data 426 on the same set of resources (e.g., in one or more slots and/or subframes) of the sidelink data channel 410b as is indicated in the control information 424.

According to some aspects, the second UE 404b may determine an RX beam of the beams 406b for receiving the data 426 based on the control information 424. For example, the control information 424 may indicate a TCI state, and the second UE 404b may determine an index corresponding to the TX beam of the beams 406a on which the first UE 404a is to send the data 426 based on the TCI state. The second UE 404b may then determine an index corresponding to an RX beam of the beams 406b based on the index corresponding to the TX beam. For example, the second UE 404b may identify the index of the RX beam that is correlated with the index of the TX beam according to a beam pair determined during the beam training process between the UEs 404a, 404b. The second UE 404b may then receive the data 426 on the sidelink data channel 410b on the RX beam of the beams 406b corresponding to the index of the TX beam of the beams 406a identified based on the TCI state.

According to some aspects, a second time gap may occur between the control information 424 on the downlink control channel 408 and the data 426 on the sidelink data channel 410b. The second time gap may be of a sufficient duration to allow the second UE 404b to process the control information 424 received on the sidelink control channel 410a before receiving the data 426 on the sidelink data channel 410b. The second time gap may be relatively shorter in duration than the first time gap.

Figure 5:
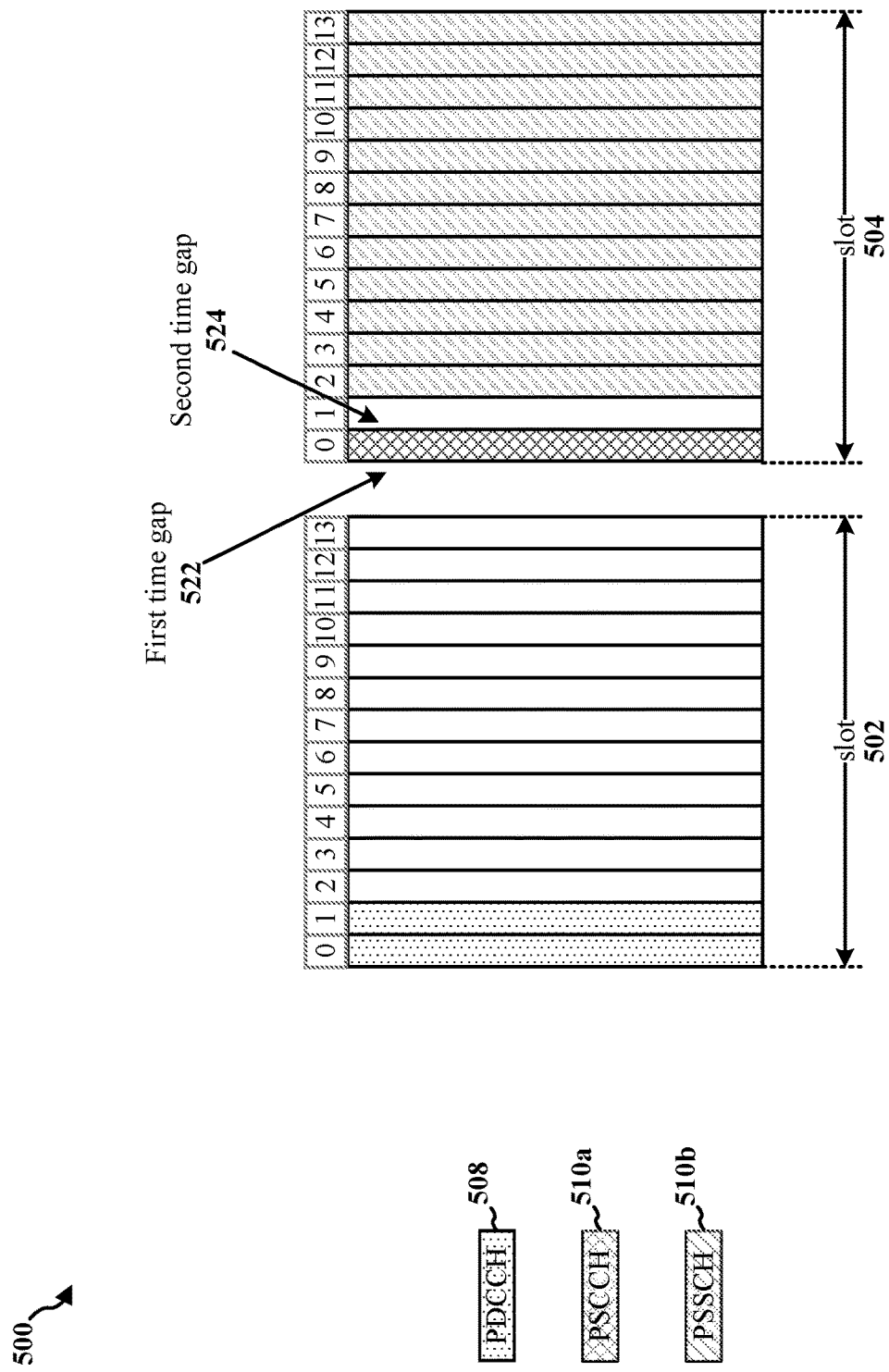
FIG. 5 is a diagram illustrating a set of slots associated with centralized scheduling of sidelink communication.

FIG. 5 is a diagram illustrating a set of slots 500 associated with centralized scheduling of sidelink communication. The set of slots 500 may include a first slot 502 allocated for downlink communication and a second slot 504 allocated for sidelink communication. The first slot 502 may include a PDCCH 508. The second slot 504 may include a PSCCH 510a and a PSSCH 510b.

The PSCCH 510a may carry control information associated with the PSSCH 510b. For example, the PSCCH 510a may carry control information indicating a schedule of the PSSCH 510*b* and, further, the PSCCH 510*a* may carry control information for decoding and/or communicating on the PSSCH 510*b*. Examples of the control information that may be carried on the PSCCH 510*a* may include an MCS associated with the PSSCH 510*b*, a HARQ process number associated with the PSSCH 510*b*, a TCI state associated with the PSSCH 510*b*, and/or other information associated with the PSSCH 510*b*.

In the context of FIG. 4, the downlink control channel 408 may be implemented as the PDCCH 508, the sidelink control channel 410*a* may be implemented as the PSCCH 510*a*, and the sidelink data channel 410*b* may be implemented as the PSSCH 510*b*. In the illustrated aspect, the PDCCH 508 may occupy the first two symbols (e.g., symbols 0-1) of the first slot 502, the PSCCH 510*a* may occupy the first symbol (e.g., symbol 0) of the second slot 504, and the PSSCH 510*b* may occupy a plurality of symbols (e.g., symbols 2-13) of the second slot 504 following the PSCCH 510*a* (e.g., the PSSCH 510*b* may occupy the remaining ten symbols of the second slot 504, following the first symbol occupied by the PSCCH 510*a* and the second symbol reserved for a second time gap 524).

The base station 402 may allocate the second slot 504 for sidelink communication between the UEs 404*a*, 404*b*. In some aspects, the base station 402 may allocate the second slot 504 such that a first time gap 522 occurs between the first slot 502 and the second slot 504. The base station 402 may then send information 422 on the PDCCH 508 indicating the set of resources allocated for the PSCCH 510*a*. The base station 402 may further indicate the IDs of the UEs 404*a*, 404*b* in the information 422 on the PDCCH 508.

The UEs 404*a*, 404*b* may detect the PDCCH 508 from the base station 402, and the PDCCH 508 may carry information indicating IDs of the UEs 404*a*, 404*b*. The PDCCH 508 may further carry information indicating a set of resources of the PSCCH 510*a* allocated for sidelink communication between the UEs 404*a*, 404*b*. For example, the PDCCH 508 may indicate that the PSCCH 510*a* occurs in the first symbol (e.g., symbol 0) of the second slot 504 allocated for sidelink communication between the UEs 404*a*, 404*b*. The first time gap 522 allocated between the first and second slots 502, 504 may allow the UEs 404*a*, 404*b* sufficient time to decode and process the information 422 carried on the PDCCH 508 so that the set of resources allocated on the PSCCH 510*a* may be used for communication of the control information 424 on the PSCCH 510*a*.

The first UE 404*a* may schedule the data 426 on the PSSCH 510*b*. In so doing, the first UE 404*a* may allocate a second time gap 524 between the PSCCH 510*a* and the PSSCH 510*b*. The second time gap 524 may be one symbol (e.g., symbol 1) of the second slot 504. The second time gap 524 may be optional and, therefore, the second time gap 524 may be absent in some other aspects.

The first UE 404*a* may send the control information 424 on the PSCCH 510*a* to the second UE 404*b*. The control information 424 may indicate at least one of an MCS for communication on the PSSCH 510*b*, information associated with a HARQ process for the PSSCH 510*b*, a set of resources allocated on the PSSCH 510*b* to carry data 426, and/or an index associated with one of the beams 406*a* of the first UE 404*a* for the communication on the PSSCH 510*b*.

Following the control information 424 on the PSCCH 510*a*, the second time gap 524 allocated between the PSCCH 510*a* and PSSCH 510*b* may allow the UEs 404*a*, 404*b* sufficient time to configure communication on the PSSCH 510*b*. For example, the second time gap 524 may allow the second UE 404*b* sufficient time to direct an RX beam of the beams 406*b* toward a TX beam of the beams 406*a* of the first UE 404*a* on the set of resources allocated in the second slot 504 for the PSSCH 510*b*.

The first UE 404*a* may then send the data 426 to the second UE 404*b* on the PSSCH 510*b* based on the control information 424. The second UE 404*b* may receive the data 426 on the PSSCH 510*b* based on the control information 424 carried on the PSCCH 510*a*.

Figure 6:
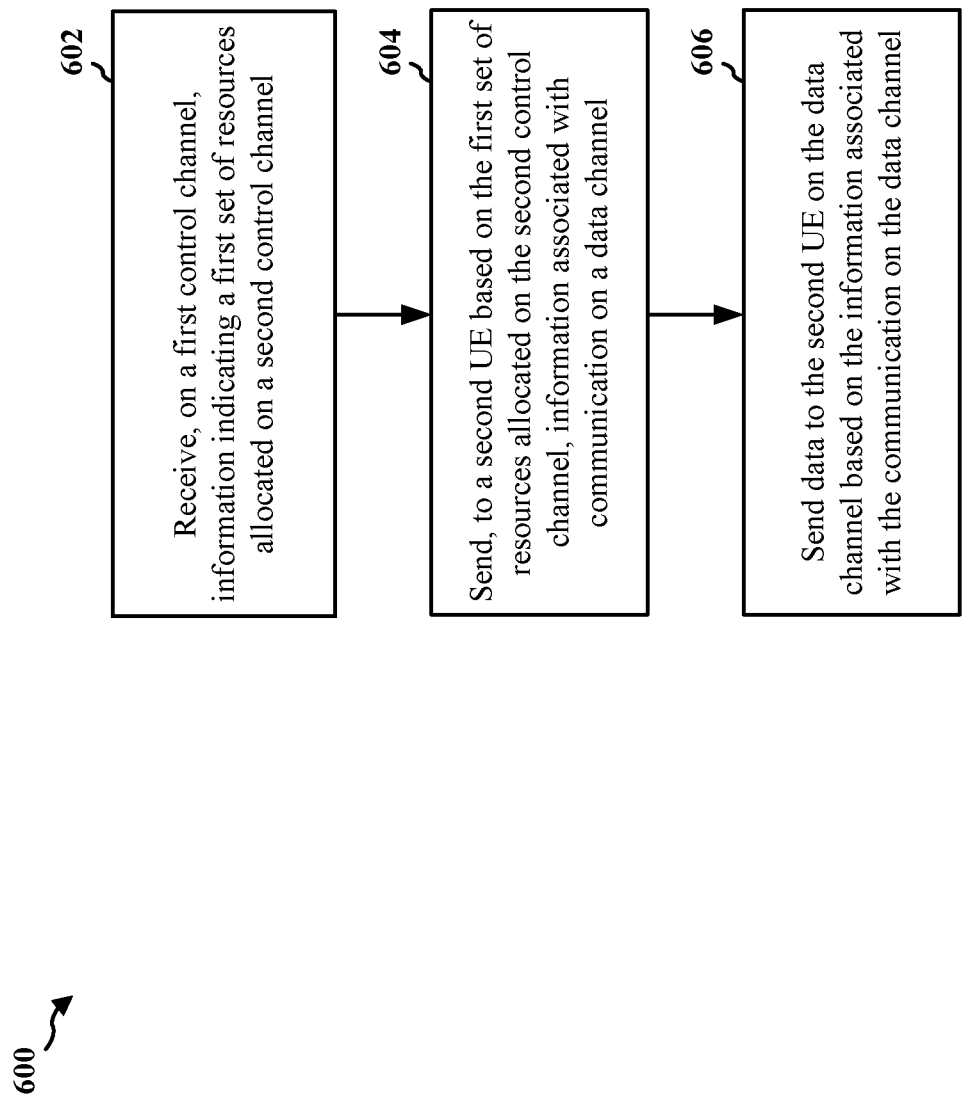
FIG. 6 is a flowchart of a method of wireless sidelink communication by a transmitting UE.

FIG. 6 is a flowchart of a method 600 of wireless communication. The method 600 may be performed by a first UE (e.g., the UE 104, 350, 404*a*; the apparatus 902/902'; the processing system 1014, which may include the memory 360 and which may be the entire UE 104, 350, 404*a* or a component of the UE 104, 350, 404*a*, such as the TX processor 368, the RX processor 356, and/or the controller/processor 359). According to various aspects, one or more of the illustrated operations may be transposed, omitted, and/or contemporaneously performed.

At 602, the first UE may receive, on a first control channel, information indicating a first set of resources allocated on a second control channel. In some aspects, the first control channel may be a PDCCH, and the second control channel may be a PSCCH. In some other aspects, the information indicating the set of resources allocated on the second control channel further indicates a first ID associated with the first UE and a second ID associated with a second UE with which the first UE is to directly communicate. For example, referring to FIG. 4, the first UE 404*a* may receive, on the downlink control channel 408, the information 422 indicating the set of resources allocated on the sidelink control channel 410*a*.

At 604, the first UE may send, to the second UE based on the first set of resources allocated on the second control channel, information associated with communication on a data channel. In some aspects, the data channel may be a PSSCH. In some other aspects, the information associated with the communication on the data channel may indicate at least one of an MCS for communication on the data channel, information associated with a HARQ process for the data channel, a set of resources allocated on the data channel to carry data from the first UE, and/or an index associated with a beam of the first UE for the communication on the data channel. In one aspect, the index associated with the beam of the first UE may include a TCI state, and the TCI state may be based on beam training between the first UE and the second UE. For example, referring to FIG. 4, the first UE 404*a* may send, to the second UE 404*b* based on the information 422 indicating the set of resources allocated on the sidelink control channel 410*a*, the control information 424 associated with the data 426 on the sidelink data channel 410*b*.

At 606, the first UE may send data to the second UE on the data channel based on the information associated with the communication on the data channel. For example, the first UE may send the data on a set of resources of the data channel, and the set of resources of the data channel on which the data is carried may be indicated by the first UE to the second UE in the information associated with the communication on the data channel. In another example, the first UE may send the data on the data channel according to an MCS that is indicated in the information associated with the communication on the data channel. In a further example, the first UE may send the data on the data channel on a beam having an index corresponding to the TCI state indicated in the information associated with the communication on the data channel. For example, referring to FIG. 4, the first UE 404a may send, to the second UE 404b based on the control information 424 on the sidelink control channel 410a, the data 426 on the sidelink data channel 410b.

According to some aspects, a first time gap occurs between the receiving on the first control channel (602) and the sending based on the first set of resources allocated on the second control channel (604), and a second time gap occurs between the sending based on the first set of resources allocated on the second control channel (604) and the sending the data on the data channel (606). The first time gap may be longer than the second time gap.

Figure 7:
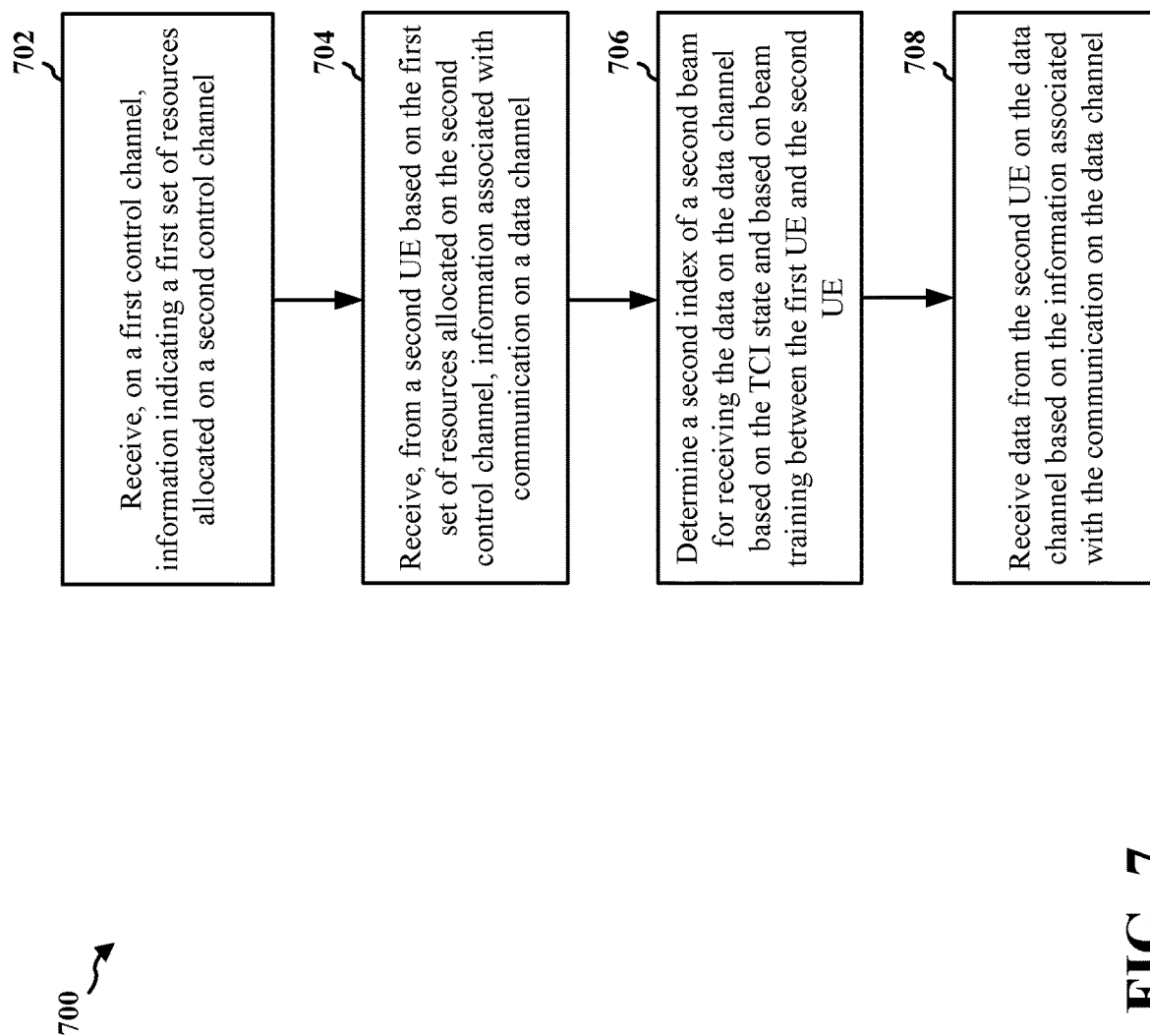
FIG. 7 is a flowchart of a method of wireless sidelink communication by a receiving UE.

FIG. 7 is a flowchart of a method 700 of wireless communication. The method 700 may be performed by a second UE (e.g., the UE 104', 350, 404b; the apparatus 1102/1102'; the processing system 1214, which may include the memory 360 and which may be the entire UE 104', 350, 404b or a component of the UE 104', 350, 404b, such as the TX processor 368, the RX processor 356, and/or the controller/processor 359). According to various aspects, one or more of the illustrated operations may be transposed, omitted, and/or contemporaneously performed.

At 702, the second UE may receive, on a first control channel, information indicating a first set of resources allocated on a second control channel. In some aspects, the first control channel may be a PDCCH, and the second control channel may be a PSCCH. In some other aspects, the information indicating the set of resources allocated on the second control channel further indicates a second ID associated with the second UE and indicates a first ID associated with a first UE with which the first UE is to directly communicate. For example, referring to FIG. 4, the second UE 404b may receive, on the downlink control channel 408, the information 422 indicating the set of resources allocated on the sidelink control channel 410a.

At 704, the second UE may receive, from the first UE based on the first set of resources allocated on the second control channel, information associated with communication on a data channel. In some aspects, the data channel may be a PSSCH. In some other aspects, the information associated with the communication on the data channel may indicate at least one of an MCS for communication on the data channel, information associated with a HARQ process for the data channel, a set of resources allocated on the data channel to carry data from the first UE, and/or an index associated with a beam of the first UE for the communication on the data channel. In one aspect, the index associated with the beam of the first UE may include a TCI state, and the TCI state may be based on beam training between the first UE and the second UE. For example, referring to FIG. 4, the first UE 404a may send, to the second UE 404b based on the information 422 indicating the set of resources allocated on the sidelink control channel 410a, the control information 424 associated with the data 426 on the sidelink data channel 410b.

At 706, the second UE may determine an index of a beam of the second UE for receiving the data on the data channel based on the TCI state and based on beam training between the first UE and the second UE. For example, the second UE may identify an index of a beam of the first UE based on the TCI state. From the beam training, the second UE may correlate indexes of TX beams of the first UE with indexes of RX beams of the second UE. Based on the correlation, the second UE may identify the index of the RX beam correlated with the index of the TX beam of the first UE indicated by the TCI state. The second UE may then monitor a set of resources indicated in the information associated with the data channel using the RX beam corresponding to the identified index. For example, referring to FIG. 4, the second UE 404b may determine an index of an RX beam of the beams 406b for receiving the data 426 on the sidelink data channel 410b based on the TCI state indicated in the control information 424 and based on beam training between the UEs 404a, 404b.

At 708, the second UE may receive data from the first UE on the data channel based on the information associated with the communication on the data channel. For example, the second UE may receive the data on a set of resources of the data channel, and the set of resources of the data channel on which the data is carried may be indicated by the first UE to the second UE in the information associated with the communication on the data channel. In another example, the second UE may receive the data on the data channel according to an MCS that is indicated in the information associated with the communication on the data channel. In a further example, the second UE may receive the data on the data channel on an RX beam identified based on a correlation with an index of a TX beam indicated by the TCI state. For example, referring to FIG. 4, the second UE 404b may receive, from the first UE 404a based on the control information 424 on the sidelink control channel 410a, the data 426 on the sidelink data channel 410b.

According to some aspects, a first time gap occurs between the receiving on the first control channel (702) and the receiving based on the first set of resources allocated on the second control channel (704), and a second time gap occurs between the receiving based on the first set of resources allocated on the second control channel (704) and the receiving the data on the data channel (708). The first time gap may be longer than the second time gap.

Figure 8:
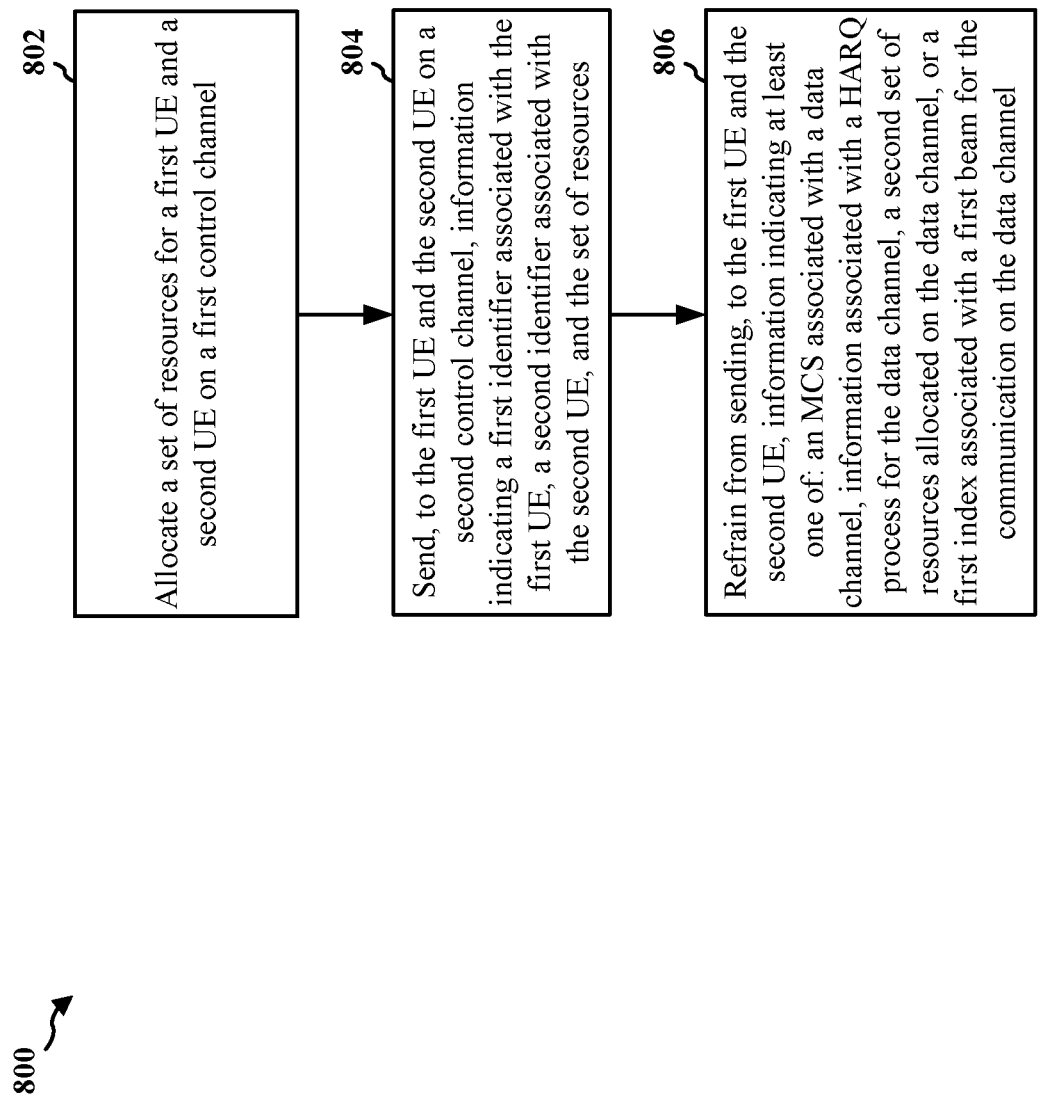
FIG. 8 is a flowchart of a method of wireless communication by a base station to facilitate sidelink communication between at least two UEs

FIG. 8 is a flowchart of a method 800 of wireless communication. The method 800 may be performed by a base station (e.g., the base station 102/180, 310, 402; the apparatus 1302/1302'; the processing system 1414, which may include the memory 376 and which may be the entire base station 102/180, 310, 402 or a component of the base station 102/180, 310, 402, such as the TX processor 316, the RX processor 370, and/or the controller/processor 375). According to various aspects, one or more of the illustrated operations may be transposed, omitted, and/or contemporaneously performed.

At 802, the base station may allocate a set of resources for a first UE and a second UE on a first control channel. For example, the base station may identify resources that are available to be assigned on the first control channel, such as by identifying a pool of resources associated with the first control channel. The base station may then select a set of resources to be allocated for the first and second UEs on the first control channel from the identified available resources, such as by determining which resources are unused, unassigned, empty (e.g., having little or no energy detected thereon), etc. The first control channel may be a PSCCH. In one aspect, the base station may allocate the set of resources based on at least one request for direct communication from at least one of the first UE or the second UE. For example, referring to FIG. 4, the base station 402 may allocate a set of resources for the UEs 404a, 404b on the sidelink control channel 410a.

In some aspects, the base station may allocate at least one gap in association with the set of resources allocated for the first UE and the second UE on the first control channel. For example, the base station may allocate a sidelink gap after resources on the first control channel and before resources on a data channel on which the first and second UEs may communicate. Potentially, this sidelink gap may be of a shorter duration than another gap (e.g., a first gap) allocated between communication by the base station with the first and second UEs and communication by the first and second UEs.

At 804, the base station may send, to the first UE and the second UE on a second control channel, information indicating a first ID associated with the first UE, a second ID associated with the second UE, and the set of resources. The second control channel may be a PDCCH, which may be assigned to both the first UE and the second UE. For example, referring to FIG. 4, the base station 402 may send, on the downlink control channel 408, the information 422 indicating the set of resources allocated on the sidelink control channel 410a. The base station 402 may send the IDs of the UEs 404a, 404b on the downlink control channel 408 to indicate that the information 422 on the downlink control channel 408 is applicable to the direct communication between both UEs 404a, 404b on the sidelink control channel 410a.

At 806, the base station may refrain from sending, to the first UE and the second UE, information indicating at least one of an MCS for communication on a data channel, information associated with a HARQ process for the data channel, a set of resources allocated on the data channel to carry data from the first UE to the second UE, and/or an index associated with a beam of the first UE for the communication on the data channel. For example, referring to FIG. 4, the base station 402 may refrain from sending, to the UEs 404a, 404b, information that is included in the control information 424 sent by the first UE 404a on the sidelink control channel 410a.

Figure 9:
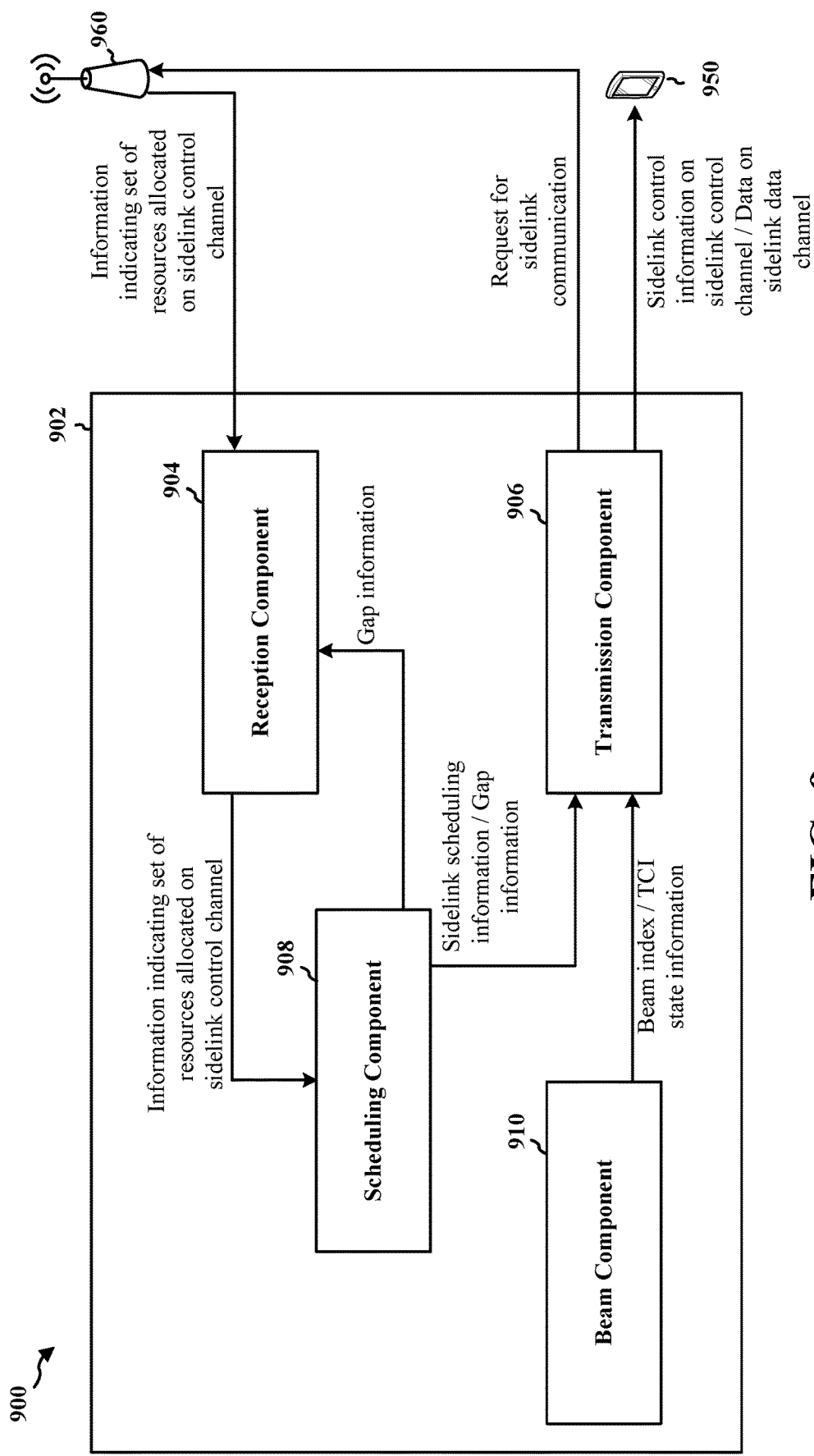
FIG. 9 is a conceptual data flow diagram illustrating the data flow between different means/components in an example apparatus.

FIG. 9 is a conceptual data flow diagram illustrating the data flow 900 between different means/components in an example apparatus 902. The apparatus 902 may be a UE. The apparatus 902 may include a transmission component 906 that is configured to send a request associated with sidelink communication to a base station 950.

The apparatus 902 may further include a reception component 904 that is configured to receive, on a first control channel, information indicating a first set of resources allocated on a second control channel, e.g., as described in connection with 602 of FIG. 6. For example, the information indicating the first set of resources allocated on a second control channel may be received from the base station 950. In one aspect, the information indicating the first set of resources allocated on the second control channel further indicates a first identifier associated with the apparatus 902 and a second identifier associated with the second UE 960. In some aspects, the first control channel may be a PDCCH, and the second control channel may be a PSCCH.

The apparatus 902 may include a scheduling component 908 that is configured to schedule communication with the second UE 960 on the second control channel and/or on a data channel. The data channel may be a PSSCH. In some aspects, the scheduling component 908 may schedule the communication with the second UE 960 based on at least one time gap. For example, the scheduling component 908 may schedule communication with the second UE 960 based on a first time gap that occurs between the receiving on the first control channel and sending based on the first set of resources allocated on the second control channel, and/or based on a second time gap that occurs between the sending based on the first set of resources allocated on the second control channel and sending data on the data channel. In some aspects, the first time gap is longer than the second time gap.

The transmission component 906 may be further configured to send, to the second UE 960 based on the first set of resources allocated on the second control channel, information associated with communication on the data channel, e.g., as described in connection with 604 of FIG. 6. In some aspects, the information associated with the communication on the data channel may indicate at least one of: an MCS, information associated with a HARQ process for the data channel, a second set of resources allocated on the data channel, and/or an index associated with a beam for the communication on the data channel. For example, the index associated with the beam for the communication on the data channel may include a TCI state, and the TCI state may be based on beam training between the apparatus 902 and the second UE 960.

The apparatus 902 may include a beam component 910 that is configured to perform beam training with the second UE 960, e.g., in order to identify one or more beams for communication with the second UE 960 on one or more channels. The beam component 910 may be configured to provide a TCI state (e.g., indicating a beam index to the reception component 904 and/or to the transmission component 906 for communication with the second UE 960. The transmission component 906 may be further configured to send data to the second UE 960 on the data channel based on the information associated with the communication on the data channel, e.g., as described in connection with 606 of FIG. 6.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
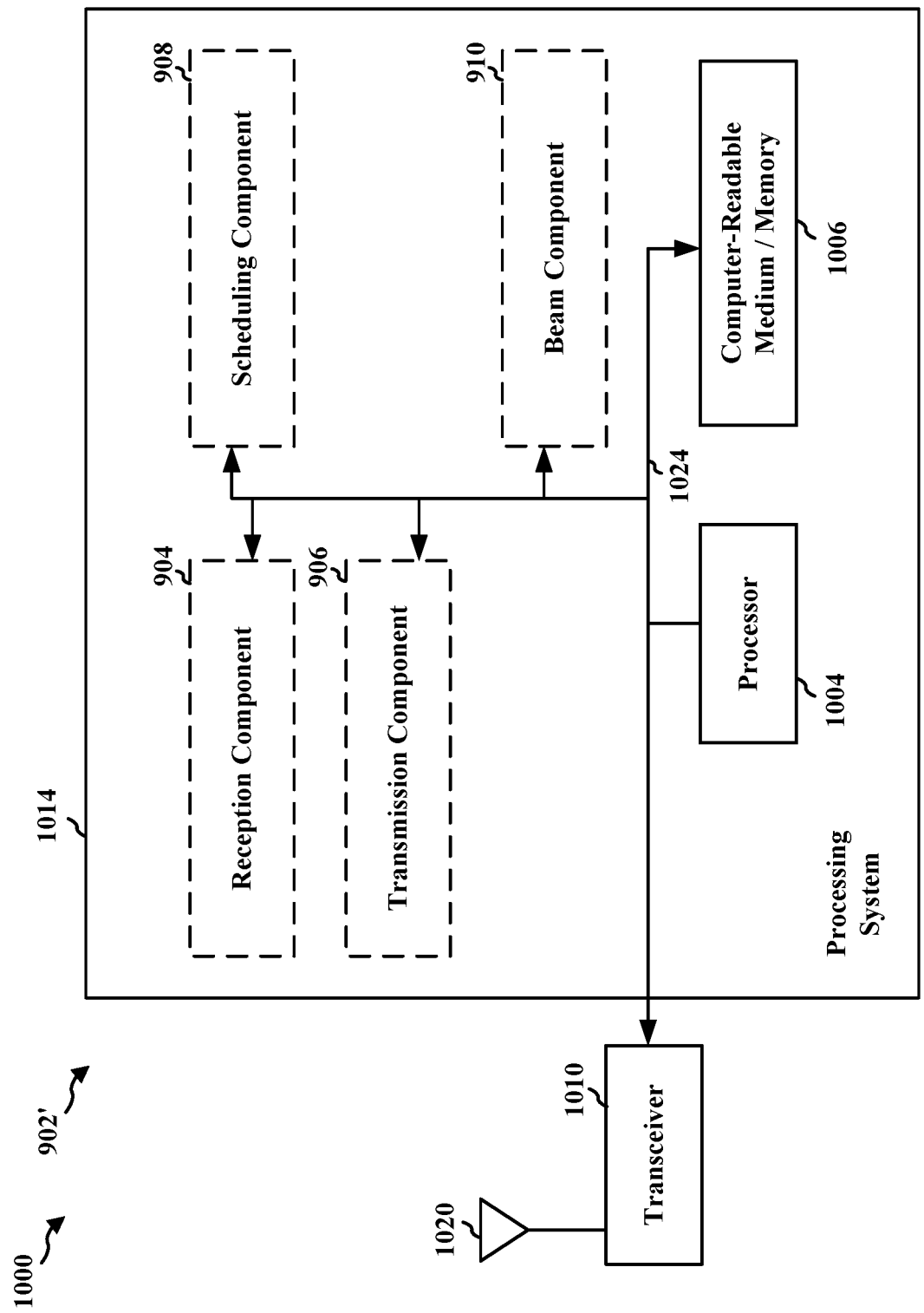
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for receiving, on a first control channel, information indicating a first set of resources allocated on a second control channel; means for sending, to a second UE based on the first set of resources allocated on the second control channel, information associated with communication on a data channel; and means for sending data to the second UE on the data channel based on the information associated with the communication on the data channel.

In one aspect, the information indicating a set of resources allocated on the second control channel further indicates a first identifier associated with the apparatus 902/902' and a second identifier associated with the second UE. In one aspect, the information associated with the communication on the data channel indicates at least one of: an MCS, information associated with a HARQ process for the data channel, a second set of resources allocated on the data channel, or an index associated with a beam for the communication on the data channel. In one aspect, the index associated with the beam for the communication on the data channel comprises a TCI state, and the TCI state may be based on beam training between the apparatus 902/902' and the second UE. In some aspects, the first control channel may be a PDCCH, the second control channel may be a PSCCH, and the data channel may be a PSSCH. In one aspect, a first time gap occurs between the receiving on the first control channel and the sending based on the first set of resources allocated on the second control channel, and a second time gap occurs between the sending based on the first set of resources allocated on the second control channel and the sending the data on the data channel, and the first time gap may be longer than the second time gap.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
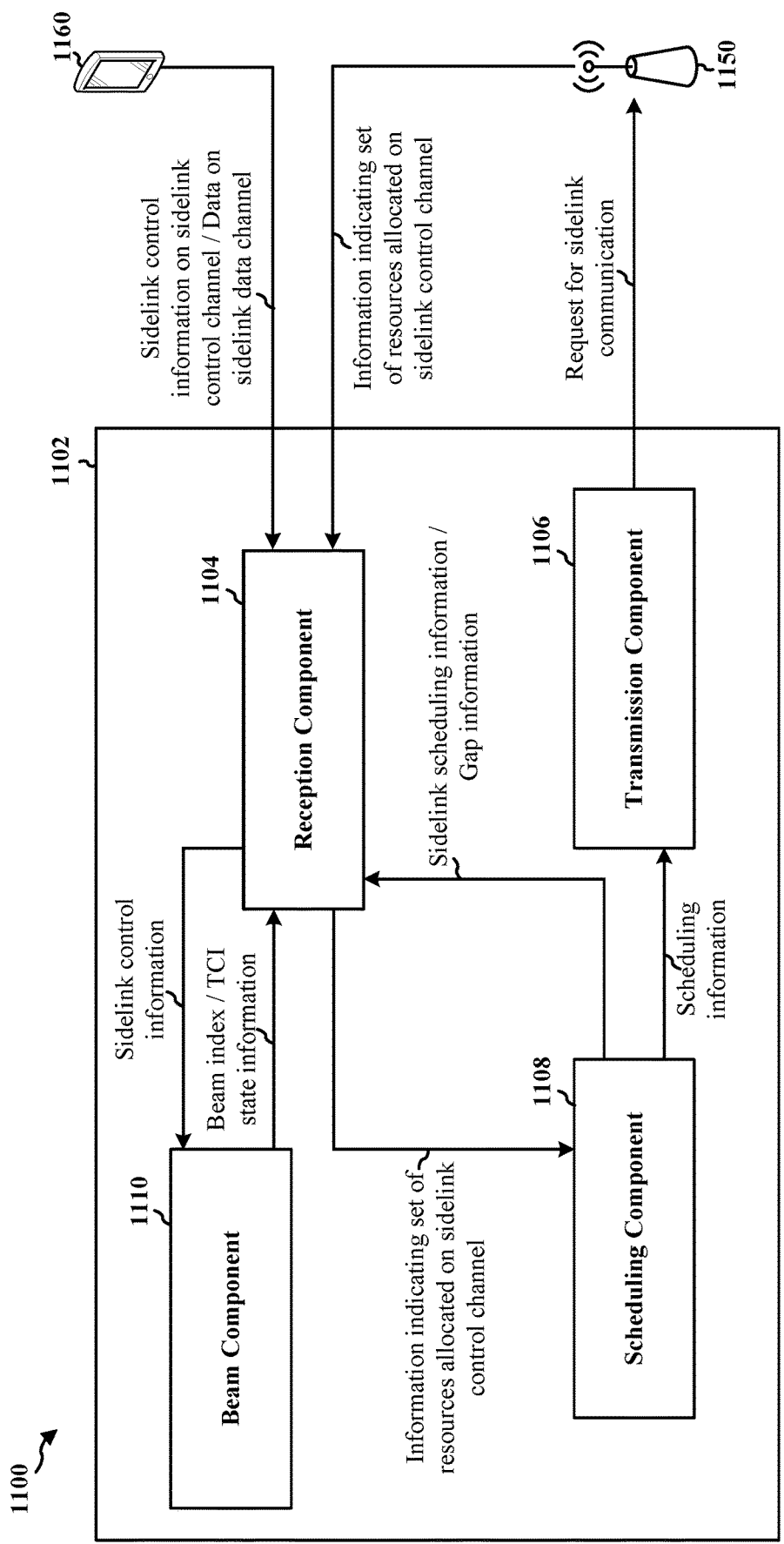
FIG. 11 is a conceptual data flow diagram illustrating the data flow between different means/components in an example apparatus.

FIG. 11 is a conceptual data flow diagram illustrating the data flow 1100 between different means/components in an example apparatus 1102. The apparatus 1102 may be a UE. The apparatus 1102 may include a transmission component 1106 that is configured to send a request associated with sidelink communication to a base station 1150.

The apparatus 1102 may further include a reception component 1104 that is configured to receive, on a first control channel, information indicating a first set of resources allocated on a second control channel, e.g., as described in connection with 702 of FIG. 7. For example, the information indicating the first set of resources allocated on a second control channel may be received from the base station 1150. In one aspect, the information indicating the first set of resources allocated on the second control channel further indicates a first identifier associated with the apparatus 1102 and a second identifier associated with the second UE 1160. In some aspects, the first control channel may be a PDCCH, and the second control channel may be a PSCCH.

The apparatus 1102 may include a scheduling component 1108 that is configured to schedule communication with the second UE 1160 on the second control channel and/or on a data channel. The data channel may be a PSSCH. In some aspects, the scheduling component 1108 may schedule the communication with the second UE 1160 based on at least one time gap. For example, the scheduling component 1108 may schedule communication with the second UE 1160 based on a first time gap that occurs between the receiving on the first control channel and receiving based on the first set of resources allocated on the second control channel, and/or based on a second time gap that occurs between the receiving based on the first set of resources allocated on the second control channel and receiving data on the data channel. In some aspects, the first time gap is longer than the second time gap.

The reception component 1104 may be further configured to receive, from the second UE 1160 based on the first set of resources allocated on the second control channel, information associated with communication on the data channel, e.g., as described in connection with 704 of FIG. 7. In some aspects, the information associated with the communication on the data channel may indicate at least one of: an MCS, information associated with a HARQ process for the data channel, a second set of resources allocated on the data channel, and/or an index associated with a beam for the communication on the data channel. For example, the index associated with the beam for the communication on the data channel may indicate a TCI state, and the TCI state may be based on beam training between the apparatus 1102 and the second UE 1160.

The apparatus 1102 may include a beam component 1110 that is configured to perform beam training with the second UE 1160, e.g., in order to identify one or more beams for communication with the second UE 1160 on one or more channels. The beam component 1110 may be configured to determine a second index of a second beam for receiving data on the data channel based on the TCI state, e.g., as described in connection with 706 of FIG. 7. In some aspects, the beam component 1110 may further determine the second index of the second beam based on beam training between the apparatus 1102 and the second UE 1160.

The beam component 1110 may provide a beam index and/or TCI state (e.g., the second beam index) to the reception component 1104 and/or to the transmission component 1106 for communication with the second UE 1160, e.g., based on the information associated with communication on the data channel received from the second UE 1160. The reception component 1104 may be further configured to receive data from the second UE 1160 on the data channel based on the information associated with the communication on the data channel, e.g., as described in connection with 706 of FIG. 7. The reception component 1104 may receive the data from the second UE 1160 based on the at least one beam index and/or TCI state provided by the beam component 1110.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
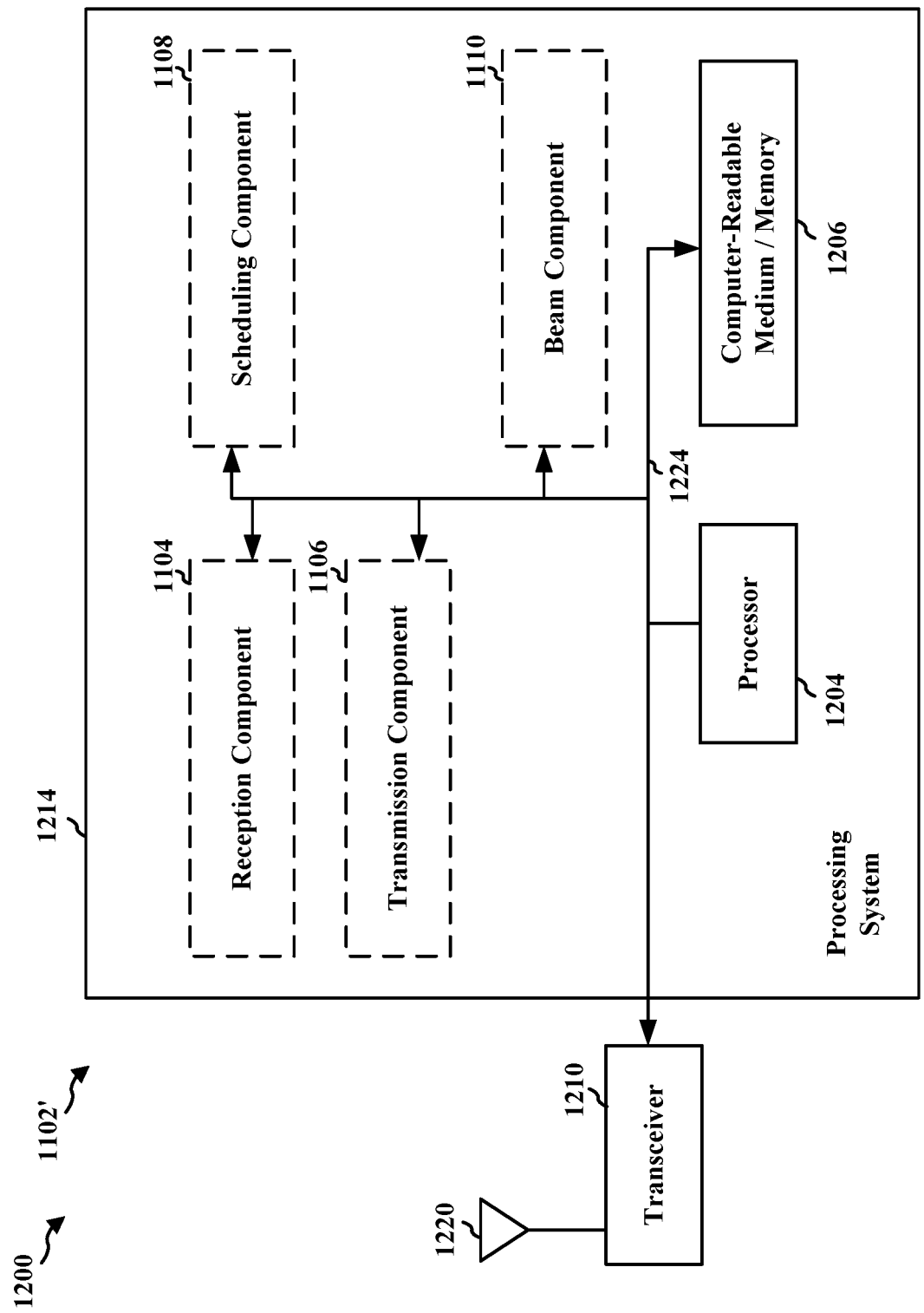
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means for receiving, on a first control channel, information indicating a first set of resources allocated on a second control channel; means for receiving, from a second UE based on the first set of resources allocated on the second control channel, information associated with communication on a data channel; and means for receiving data from the second UE on the data channel based on the information associated with the communication on the data channel.

In one aspect, the information indicating a set of resources allocated on a second control channel further indicates a first identifier associated with the apparatus 1102/1102' and a second identifier associated with the second UE. In one aspect, the information associated with the communication on the data channel indicates at least one of: an MCS, information associated with a HARQ process for the data channel, a second set of resources allocated on the data channel, or a first index associated with a first beam for the communication on the data channel. In one aspect, the index associated with the beam for the communication on the data channel comprises a TCI state, and the apparatus 1102/1102' may further include means for determining a second index of a second beam for receiving the data on the data channel based on the TCI state and based on beam training between the apparatus 1102/1102' and the second UE. In one aspect, the first control channel may be a PDCCH, the second control channel may be a PSCCH, and the data channel may be a PSSCH. In one aspect, a first time gap occurs between the receiving on the first control channel and the receiving based on the first set of resources allocated on the second control channel, and a second time gap occurs between the receiving based on the first set of resources allocated on the second control channel and the receiving the data on the data channel, and the first time gap may be longer than the second time gap.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
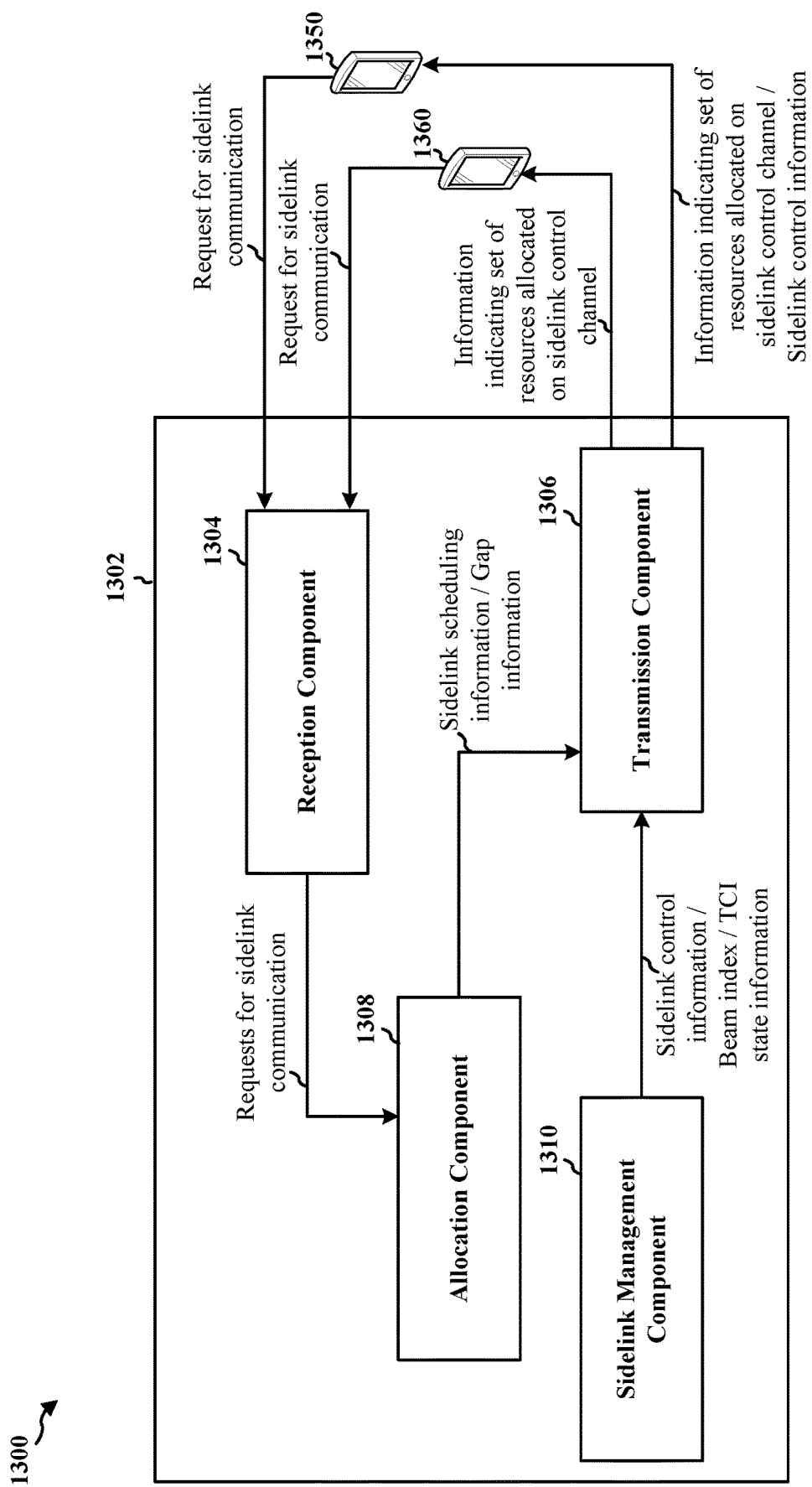
FIG. 13 is a conceptual data flow diagram illustrating the data flow between different means/components in an example apparatus.

FIG. 13 is a conceptual data flow diagram illustrating the data flow 1300 between different means/components in an example apparatus 1302. The apparatus 1302 may be a base station. The apparatus 1302 includes a reception component 1304 that is configured to receive a respective request for an allocation of resources on a first control channel from each of a first UE 1350 and a second UE 1360.

The apparatus 1302 may include an allocation component that is configured to allocate a set of resources for the first UE 1350 and the second UE 1360 on the first control channel, e.g., as described in connection with 802 of FIG. 8.

The apparatus 1302 may include a transmission component 1306 that is configured to send, to the first UE 1350 and the second UE 1360 on a second control channel, information indicating a first identifier associated with the first UE 1350, a second identifier associated with the second UE 1360, and the allocated set of resources, e.g., as described in connection with 804 of FIG. 8.

The apparatus 1302 may include a sidelink management component 1310 that is configured to determine information indicating at least one of an MCS associated with a data channel on which the first UE 1350 and the second UE 1360 may communicate, information associated with a HARQ process for the data channel, a second set of resources allocated on the data channel, and/or a first index associated with a first beam for communication on the data channel (e.g., a TCI state for the first UE 1350 and/or the second UE 1360). In some aspects, the sidelink management component 1310 may be configured to provide at least a portion of the foregoing information to the transmission component 1306 for transmission to at least the first UE 1350. In some other aspects, the sidelink management component 1310 may be configured to refrain from sending, to the first UE 1350 and the second UE 1360, information indicating at least one of the MCS, information associated with the HARQ process for the data channel, the second set of resources allocated on the data channel, and/or the first index associated with the first beam for the communication on the data channel, e.g., as described in connection with 806 of FIG. 8.

According to various aspects, the first control channel may be a PSCCH, the second control channel may be a PDCCH, and the data channel may be a PSSCH. In some aspects, the allocation component 1308 may allocate a first gap and/or a second gap. For example, a first time gap may occur between the transmission on the second control channel and communication by the first UE 1350 and the second UE 1360 based on the set of resources allocated on the first control channel, and a second time gap may occur between communication by the first UE 1350 and the second UE 1360 based on the set of resources allocated on the first control channel and communication by the first UE 1350 and the second UE 1360 of data on the data channel. The first time gap may be longer than the second time gap.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
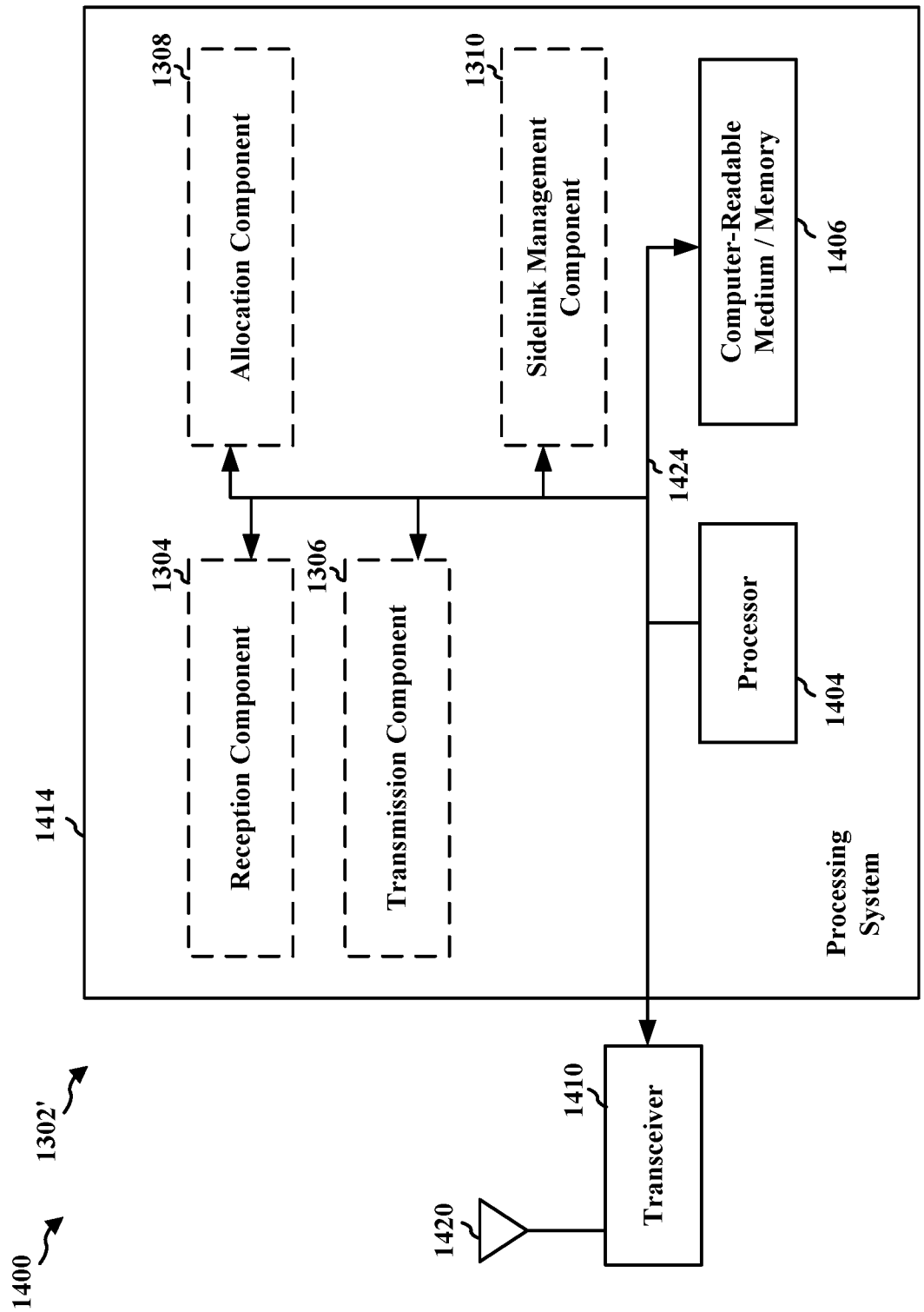
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for allocating a set of resources for a first UE and a second UE on a first control channel; and means for sending, to the first UE and the second UE on a second control channel, information indicating a first identifier associated with the first UE, a second identifier associated with the second UE, and the set of resources.

In one aspect, the apparatus 1302/1302' may further include means for refraining from sending, to the first UE and the second UE, information indicating at least one of: an MCS associated with a data channel, information associated with a HARQ process for the data channel, a second set of resources allocated on the data channel, or a first index associated with a first beam for the communication on the data channel. In one aspect, the first control channel may be a PSCCH, the second control channel may be a PDCCH, and the data channel may be a PSSCH.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first user equipment (UE), the method comprising:
   receiving, on a first control channel, information indicating a first set of resources allocated on a second control channel and further indicating a first identifier associated with the first UE and a second identifier associated with a second UE;
   sending, to the second UE based on the first set of resources allocated on the second control channel, information associated with communication on a data channel; and
   sending data to the second UE on the data channel based on the information associated with the communication on the data channel.

2. The method of claim 1, wherein the information associated with the communication on the data channel indicates at least one of:
   a modulation and coding scheme (MCS),
   information associated with a hybrid automatic repeat request (HARQ) process for the data channel,
   a second set of resources allocated on the data channel, or
   an index associated with a beam for the communication on the data channel.

3. The method of claim 2, wherein the index associated with the beam for the communication on the data channel comprises a transmission configuration indication (TCI) state, and wherein the TCI state is based on beam training between the first UE and the second UE.

4. The method of claim 1, wherein the first control channel comprises a physical downlink control channel (PDCCH), the second control channel comprises a physical sidelink control channel (PSCCH), and the data channel comprises a physical sidelink shared channel (PSSCH).

5. The method of claim 1, wherein a first time gap occurs between the receiving on the first control channel and the sending based on the first set of resources allocated on the second control channel, and a second time gap occurs between the sending based on the first set of resources allocated on the second control channel and the sending the data on the data channel, and wherein the first time gap is longer than the second time gap.

6. A method of wireless communication by a first user equipment (UE), the method comprising:
   receiving, on a first control channel, information indicating a first set of resources allocated on a second control channel and further indicating a first identifier associated with the first UE and a second identifier associated with a second UE;
   receiving, from the second UE based on the first set of resources allocated on the second control channel, information associated with communication on a data channel; and
   receiving data from the second UE on the data channel based on the information associated with the communication on the data channel.

7. The method of claim 6, wherein the information associated with the communication on the data channel indicates at least one of:
   a modulation and coding scheme (MCS),
   information associated with a hybrid automatic repeat request (HARQ) process for the data channel,
   a second set of resources allocated on the data channel, or
   a first index associated with a first beam for the communication on the data channel.

8. The method of claim 7, wherein the index associated with the beam for the communication on the data channel comprises a transmission configuration indication (TCI) state, and the method further comprising:
   determining a second index of a second beam for receiving the data on the data channel based on the TCI state and based on beam training between the first UE and the second UE.

9. The method of claim 6, wherein the first control channel comprises a physical downlink control channel (PDCCH), the second control channel comprises a physical sidelink control channel (PSCCH), and the data channel comprises a physical sidelink shared channel (PSSCH).

10. The method of claim 6, wherein a first time gap occurs between the receiving on the first control channel and the receiving based on the first set of resources allocated on the second control channel, and a second time gap occurs between the receiving based on the first set of resources allocated on the second control channel and the receiving the data on the data channel, and wherein the first time gap is longer than the second time gap.

11. A first user equipment (UE), comprising:
   a memory; and
   at least one processor coupled to the memory and configured to:
      receive, on a first control channel, information indicating a first set of resources allocated on a second control channel and further indicating a first identifier associated with the first UE and a second identifier associated with a second UE;

send, to the second UE based on the first set of resources allocated on the second control channel, information associated with communication on a data channel; and send data to the second UE on the data channel based on the information associated with the communication on the data channel.

12. The first UE of claim 11, wherein the information associated with the communication on the data channel indicates at least one of:

a modulation and coding scheme (MCS), information associated with a hybrid automatic repeat request (HARQ) process for the data channel, a second set of resources allocated on the data channel, or an index associated with a beam for the communication on the data channel.

13. The first UE of claim 12, wherein the index associated with the beam for the communication on the data channel comprises a transmission configuration indication (TCI) state, and wherein the TCI state is based on beam training between the first UE and the second UE.

14. The first UE of claim 11, wherein the first control channel comprises a physical downlink control channel (PDCCH), the second control channel comprises a physical sidelink control channel (PSCCH), and the data channel comprises a physical sidelink shared channel (PSSCH).

15. The first UE of claim 11, wherein a first time gap occurs between the receiving on the first control channel and the sending based on the first set of resources allocated on the second control channel, and a second time gap occurs between the sending based on the first set of resources allocated on the second control channel and the sending the data on the data channel, and wherein the first time gap is longer than the second time gap.

16. A first user equipment (UE), comprising:

a memory; and at least one processor coupled to the memory and configured to:

receive, on a first control channel, information indicating a first set of resources allocated on a second control channel and further indicating a first identifier associated with the first UE and a second identifier associated with a second UE;

receive, from the second UE based on the first set of resources allocated on the second control channel, information associated with communication on a data channel; and receive data from the second UE on the data channel based on the information associated with the communication on the data channel.

17. The first UE of claim 16, wherein the information associated with the communication on the data channel indicates at least one of:

a modulation and coding scheme (MCS), information associated with a hybrid automatic repeat request (HARQ) process for the data channel, a second set of resources allocated on the data channel, or a first index associated with a first beam for the communication on the data channel.

18. The first UE of claim 17, wherein the index associated with the beam for the communication on the data channel comprises a transmission configuration indication (TCI) state, and the at least one processor is further configured to:

determine a second index of a second beam for receiving the data on the data channel based on the TCI state and based on beam training between the first UE and the second UE.

19. The first UE of claim 16, wherein the first control channel comprises a physical downlink control channel (PDCCH), the second control channel comprises a physical sidelink control channel (PSCCH), and the data channel comprises a physical sidelink shared channel (PSSCH).

20. The first UE of claim 16, wherein a first time gap occurs between the receiving on the first control channel and the receiving based on the first set of resources allocated on the second control channel, and a second time gap occurs between the receiving based on the first set of resources allocated on the second control channel and the receiving the data on the data channel, and wherein the first time gap is longer than the second time gap.

* * * * *